United States Patent
Ono

(10) Patent No.: US 10,108,463 B2
(45) Date of Patent: Oct. 23, 2018

(54) SYSTEM, METHOD OF CONTROLLING TO EXECUTE A JOB, AND APPARATUS

(71) Applicant: FUJITSU LIMITED, Kawasaki-shi, Kanagawa (JP)

(72) Inventor: Takatsugu Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 126 days.

(21) Appl. No.: 14/884,098

(22) Filed: Oct. 15, 2015

(65) Prior Publication Data
US 2016/0110227 A1 Apr. 21, 2016

(30) Foreign Application Priority Data
Oct. 21, 2014 (JP) .................................. 2014-214644

(51) Int. Cl.
*G06F 9/455* (2018.01)
*G06F 9/50* (2006.01)
*G06F 9/48* (2006.01)

(52) U.S. Cl.
CPC ........ *G06F 9/5083* (2013.01); *G06F 9/45558* (2013.01); *G06F 9/4881* (2013.01); *G06F 2009/4557* (2013.01)

(58) Field of Classification Search
CPC .................................................. G06F 9/5083
See application file for complete search history.

(56) References Cited

U.S. PATENT DOCUMENTS

| | | | | |
|---|---|---|---|---|
| 8,572,614 B2 * | 10/2013 | Krishnamurthy | ..... | G06F 9/5044 709/223 |
| 2003/0084088 A1 * | 5/2003 | Shaffer | ................. | G06F 9/5044 718/104 |
| 2004/0054842 A1 * | 3/2004 | Tse | ......................... | G06F 13/387 710/313 |
| 2009/0241112 A1 | 9/2009 | Shimogawa | | |
| 2009/0268247 A1 * | 10/2009 | Ruml | ..................... | G06Q 10/06 358/1.15 |
| 2010/0087200 A1 * | 4/2010 | Ishii | ...................... | H04W 28/16 455/450 |
| 2011/0102825 A1 * | 5/2011 | Yamada | ................ | G06F 3/1215 358/1.13 |
| 2012/0272241 A1 * | 10/2012 | Nonaka | ................. | G06F 9/5077 718/1 |

(Continued)

FOREIGN PATENT DOCUMENTS

JP 2009-223842 10/2009
JP 2013-196062 9/2013

*Primary Examiner* — Emerson C Puente
*Assistant Examiner* — Steven M Do
(74) *Attorney, Agent, or Firm* — Staas & Halsey LLP

(57) ABSTRACT

A system includes a plurality of physical calculation nodes and a controller. The controller is configured to execute a process including: determining a type of a target job based on a processing load for execution of the target job, first instructing a first physical calculation node among the plurality of physical calculation nodes to execute the target job when it is determined that the type of the target job is a first type, and second instructing a virtual machine running on a second physical calculation node among the plurality of physical calculation nodes to execute the target job when it is determined that the type of the target job is a second type, a job of the second type being required a lower processing load for the execution of the job than a job of the first type.

20 Claims, 17 Drawing Sheets

(56) References Cited

U.S. PATENT DOCUMENTS

2013/0247061 A1* 9/2013 Kiehn .................. G06F 9/5044
718/104
2014/0355448 A1* 12/2014 Kawano ................. H04L 45/64
370/236
2015/0074150 A1* 3/2015 Kapur ............... G06F 17/30584
707/803

* cited by examiner

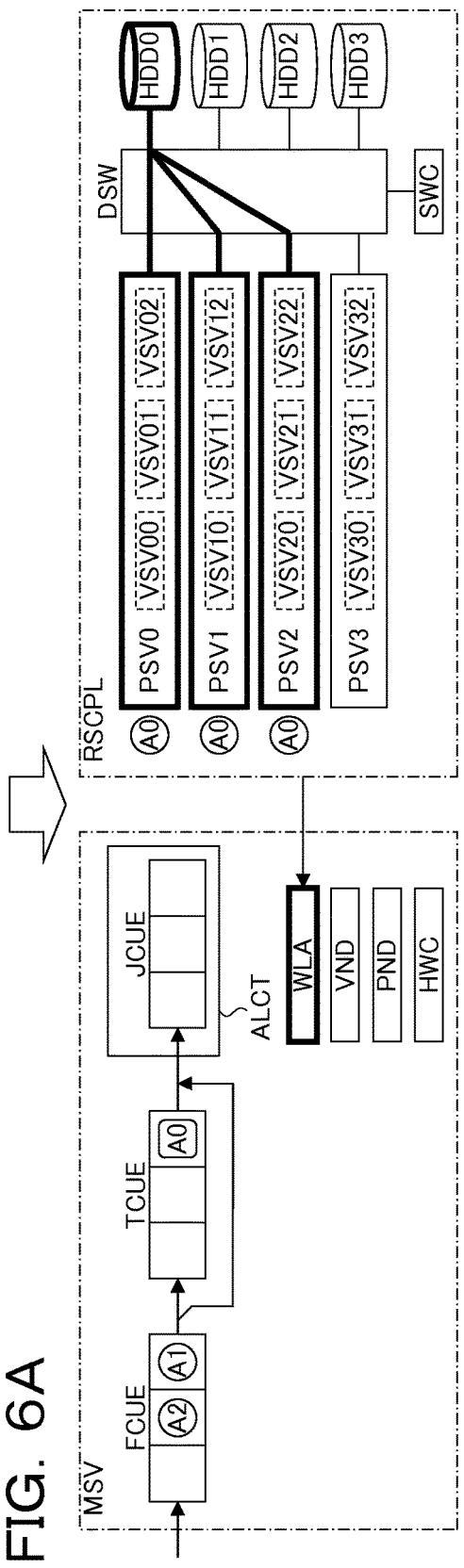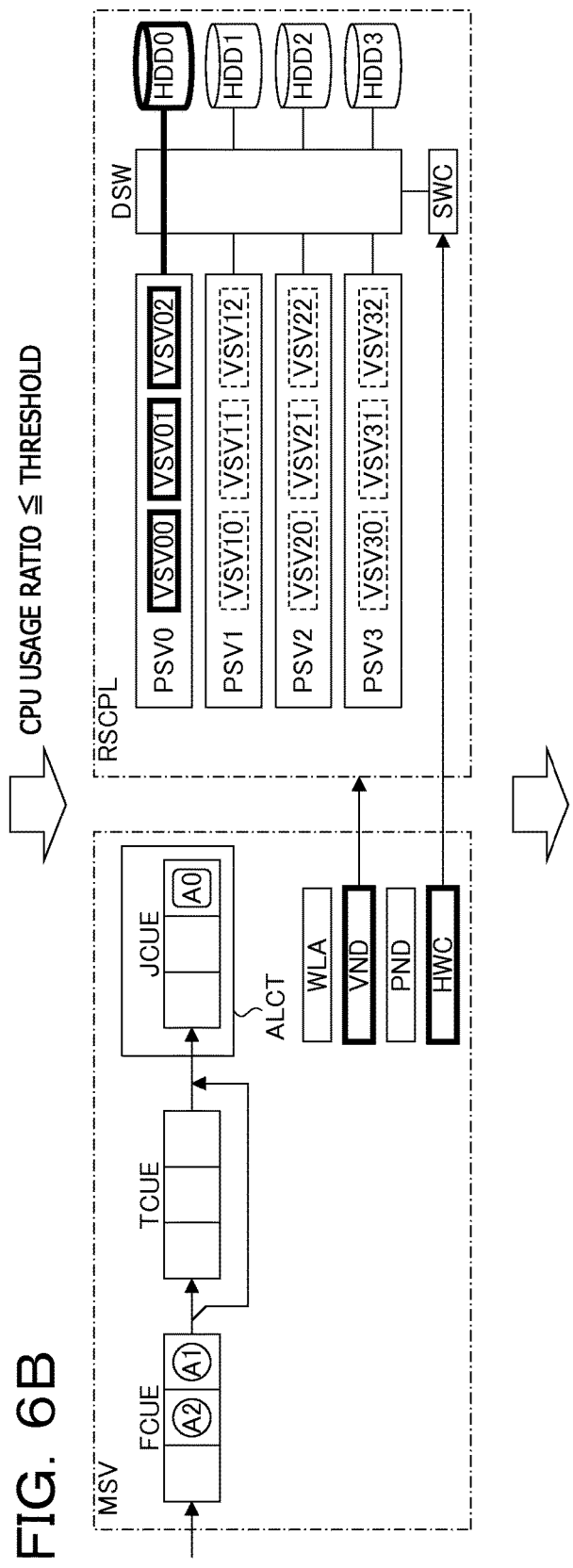

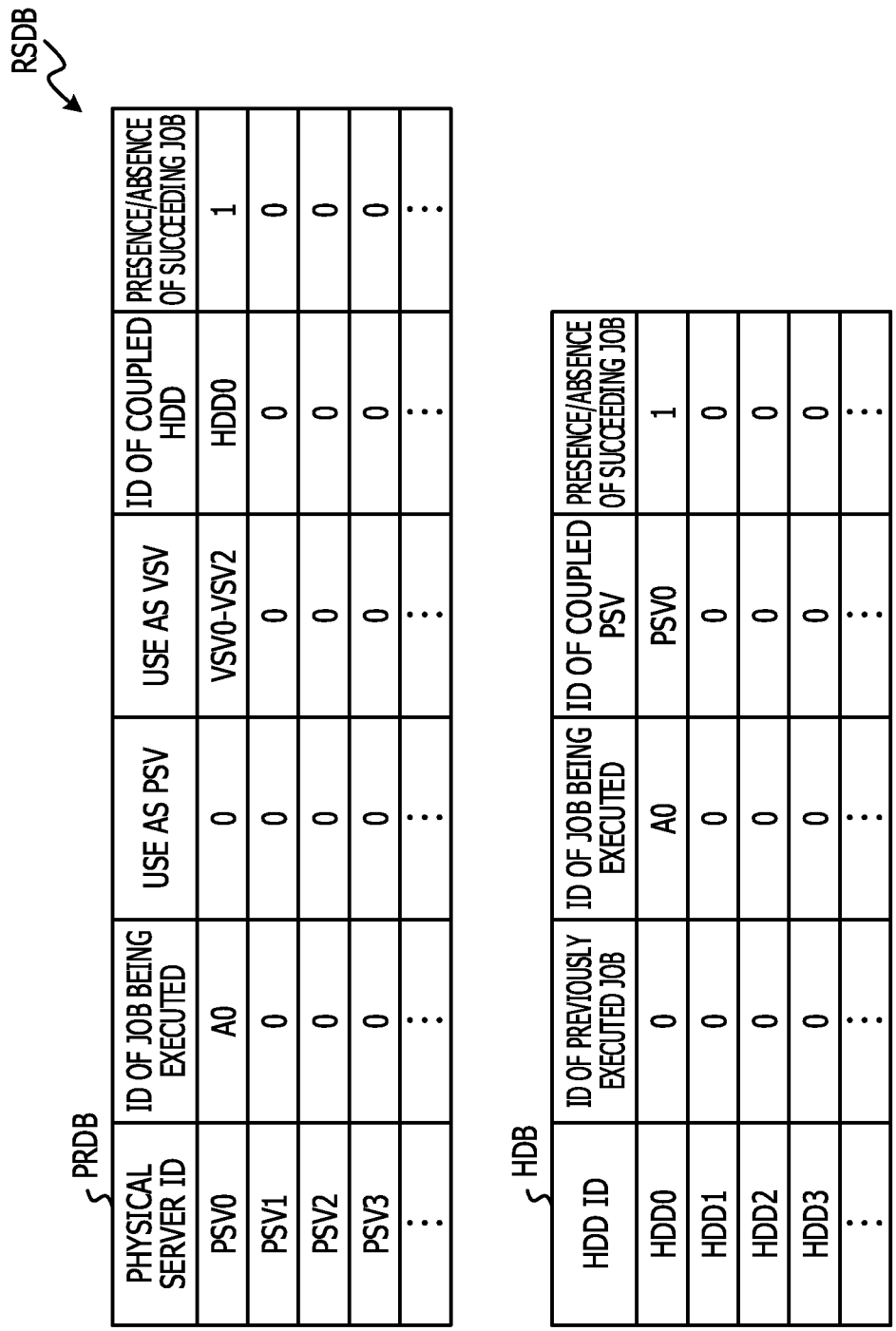

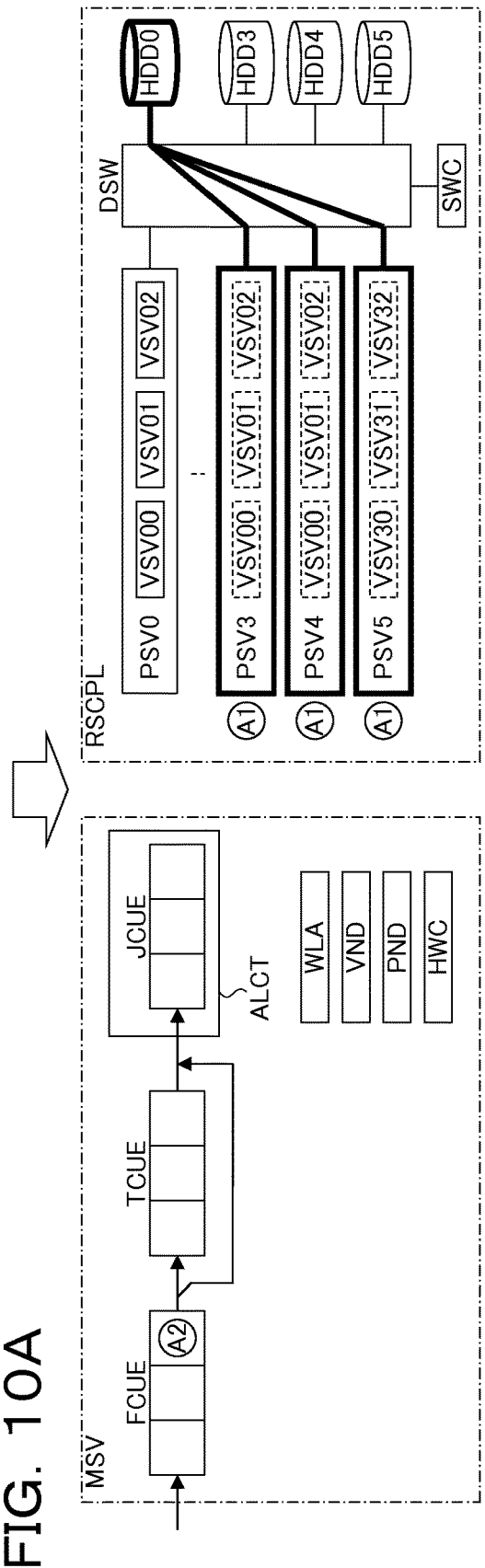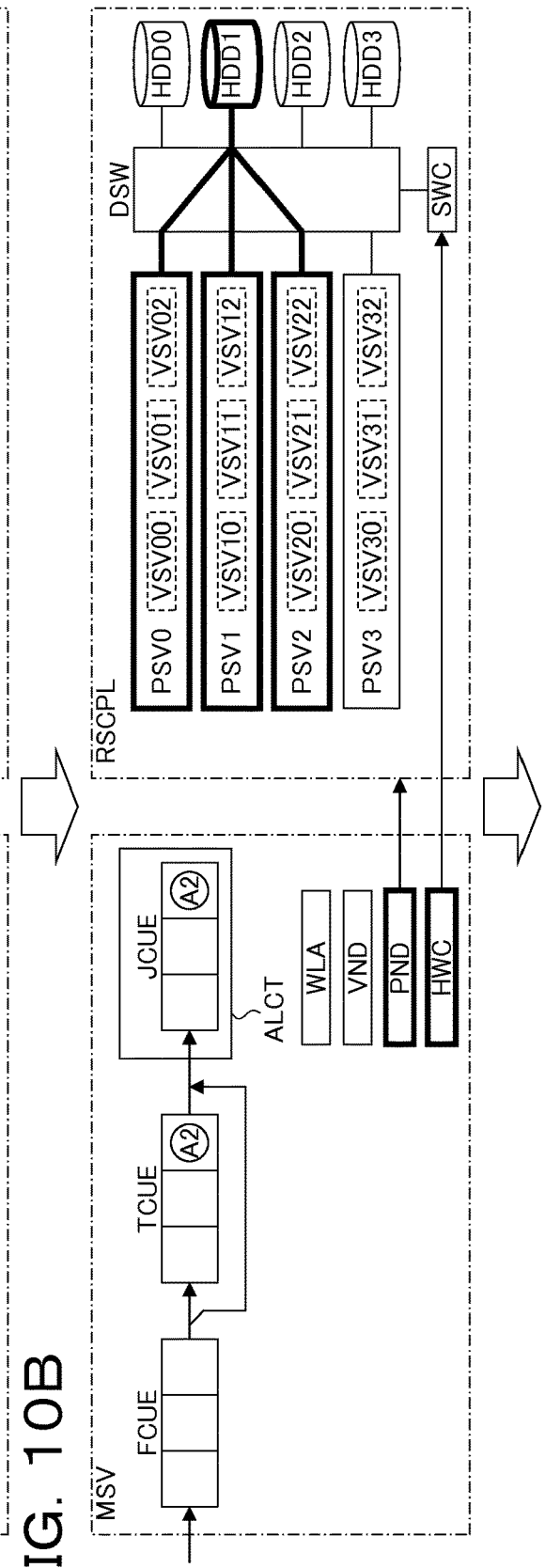

FIG. 11

PRDB

| PHYSICAL SERVER ID | ID OF JOB BEING EXECUTED | USE AS PSV | USE AS VSV | ID OF COUPLED HDD | PRESENCE/ABSENCE OF SUCCEEDING JOB |
|---|---|---|---|---|---|
| PSV0 | 0 | 0 | 0 | 0 | 0 |
| ... | ... | ... | ... | ... | ... |
| PSV3 | A1 | 1 | 0 | HDD0 | 1 |
| PSV4 | A1 | 1 | 0 | HDD0 | 1 |
| PSV5 | A1 | 1 | 0 | HDD0 | 1 |

HDB

| HDD ID | ID OF PREVIOUSLY EXECUTED JOB | ID OF JOB BEING EXECUTED | ID OF COUPLED PSV | PRESENCE/ABSENCE OF SUCCEEDING JOB |
|---|---|---|---|---|
| HDD0 | A0 | A1 | PSV3-PSV5 | 1 |
| HDD1 | 0 | 0 | 0 | 0 |
| HDD2 | 0 | 0 | 0 | 0 |
| HDD3 | 0 | 0 | 0 | 0 |
| ... | ... | ... | ... | ... |

RSDB

2

SYSTEM, METHOD OF CONTROLLING TO EXECUTE A JOB, AND APPARATUS

CROSS-REFERENCE TO RELATED APPLICATION

This application is based upon and claims the benefit of priority of the prior Japanese Patent Application No. 2014-214644, filed on Oct. 21, 2014, the entire contents of which are incorporated herein by reference.

FIELD

The embodiments discussed herein are related to a system, a method of controlling to execute a job, and an apparatus.

BACKGROUND

Information processing systems such as virtual machine systems execute jobs which are roughly classified into a type of jobs mainly for arithmetic processing and a type of jobs mainly for access to an input-output device. The job mainly for arithmetic processing exerts a larger load on a central processing unit (CPU) than the job mainly for access to an input-output device. For example, there has been proposed a method for a virtual machine system to execute a job mainly for arithmetic processing and a job mainly for access to an input-output device by using different CPUs, and allocating the CPUs to virtual machines for respectively different time periods.

There has been proposed another method of executing different types of processing by multiple virtual machines running on an information processor such as a server, with priorities respectively given to the virtual machines, so that processing executed by the virtual machine having the high priority may not be delayed.

Examples of the known conventional techniques include Japanese Laid-open Patent Publication Nos. 2009-223842 and 2013-196062.

SUMMARY

According to an aspect of the invention, a system includes: a plurality of physical calculation nodes; and a controller including a memory and a processor coupled to the memory, wherein the processor is configured to execute a process including: determining a type of a target job based on a processing load for execution of the target job, first instructing a first physical calculation node among the plurality of physical calculation nodes to execute the target job when it is determined that the type of the target job is a first type, and second instructing a virtual machine running on a second physical calculation node among the plurality of physical calculation nodes to execute the target job when it is determined that the type of the target job is a second type, a job of the second type being required a lower processing load for the execution of the job than a job of the first type.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B illustrate an example of the operation following the operation illustrated in FIGS. 5A and 5B;

FIG. 8 illustrates an example of a resource database in which a job of low-load type A0 is being executed in FIG. 7A;

FIGS. 10A and 10B illustrate an example of the operation following the operation illustrated in FIGS. 9A and 9B;

FIG. 11 illustrates an example of a resource database in the case where a job of high-load type A1 is being executed in FIG. 10A;

DESCRIPTION OF EMBODIMENTS

A virtual machine has lower arithmetic processing performance than a physical machine. Thus, the processing efficiency of a job mainly for arithmetic processing is lower when the virtual machine executes the job than when the physical machine executes the job. To improve the processing efficiency of a job, it is preferable to determine which one of the virtual machine or the physical machine is to execute the job based on the job type.

An object of the embodiments is to improve the job processing efficiency in execution of multiple types of jobs.

The embodiments will be described below with reference to the drawings.

Figure 1:
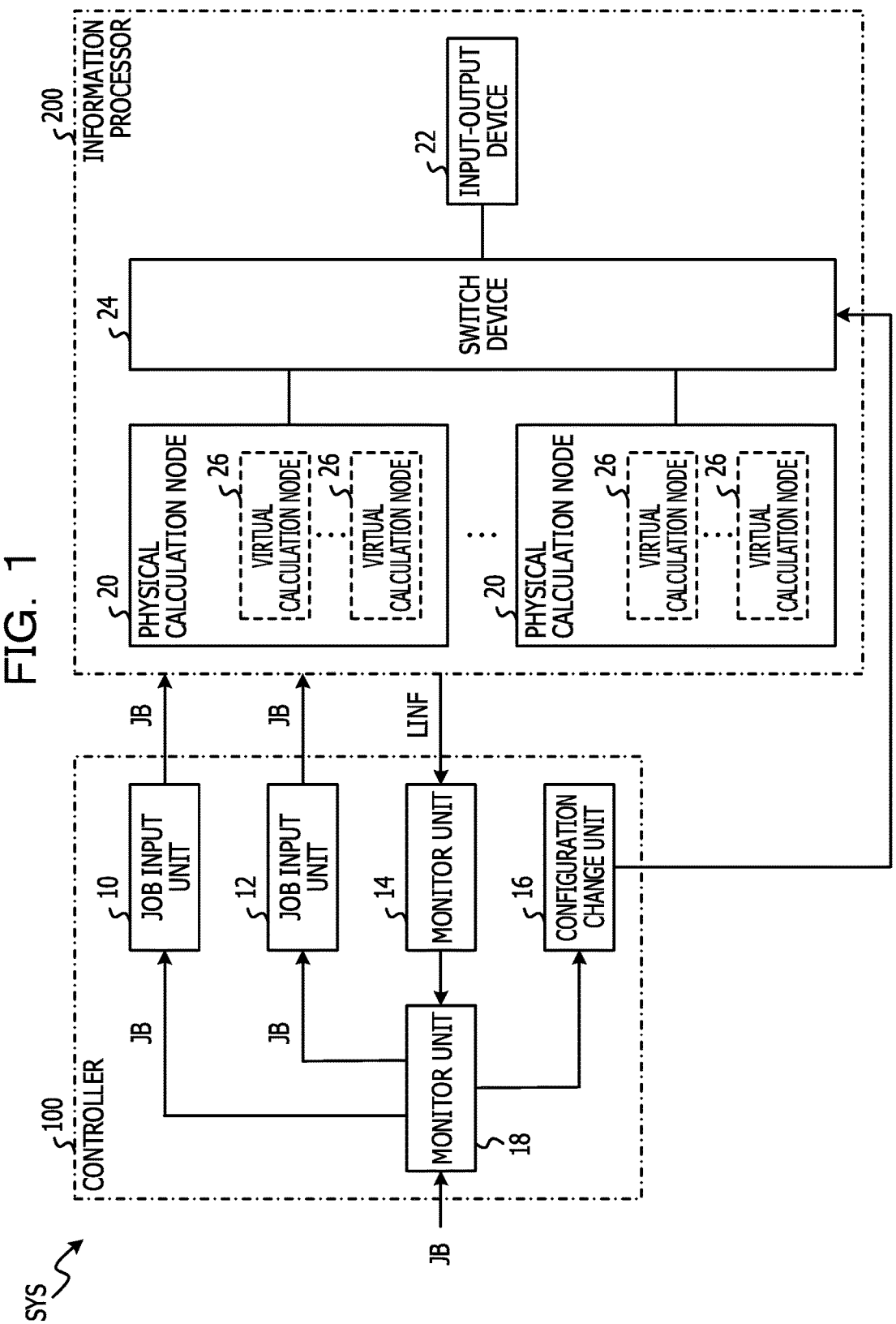
FIG. 1 illustrates an embodiment of an information processing system.

FIG. 1 illustrates an embodiment of an information processing system including a controller, and a method of controlling the information processing system. An information processing system SYS1 illustrated in FIG. 1 includes an information processor 200 and a controller 100 for controlling the information processor 200. The controller 100 has a job input units 10, 12, a monitor unit 14, a configuration change unit 16, and a control unit 18. The information processor 200 has multiple physical calculation nodes 20, an input-output device 22, and a switch device 24.

The job input unit 10 inputs a job JB transferred from the control unit 18 to one of the physical calculation nodes 20. The job input unit 10 may have a function of selecting the physical calculation node 20 to which the job JB is inputted from among the unused physical calculation nodes 20. When the unused physical calculation nodes 20 are not activated, the job input unit 10 may have a function of activating the selected physical calculation node 20.

The job input unit 12 inputs the job JB transferred from the control unit 18 to virtual calculation nodes 26 acquired by virtualizing one of the physical calculation nodes 20. The job input unit 12 may have a function of selecting the physical calculation node 20 from among the unused physical calculation nodes 20, and activating the virtual calculation nodes 26 in the selected physical calculation node 20. When the unused physical calculation nodes 20 are not activated, the job input unit 12 may have a function of activating the selected physical calculation node 20.

When the job input unit 10 inputs the job JB to one of the physical calculation nodes 20, the monitor unit 14 monitors load information LINF indicating a load of the physical calculation node 20 to which the job JB is inputted. For example, in a type determination test of determining the type of the job JB, the monitor unit 14 monitors the load information LINF.

According to an instruction from the control unit 18, the configuration change unit 16 causes the switch device 24 to change coupling of the input-output device 22 to the physical calculation node 20.

The control unit 18 receives the job JB from the outside of the information processing system SYS1, inputs the received job JB to the physical calculation node 20 via the job input unit 10, and performs the type determination test. Then, the control unit 18 determines the type of the job JB based on the load information LINF received from the information processor 200 to determine whether the job JB is executed by the physical calculation node 20 or the virtual calculation nodes 26. For example, when the load of the physical calculation node 20, which is indicated in the load information LINF, is higher than a predetermined threshold, the control unit 18 determines the type of the job JB as a high-load type. When the load of the physical calculation node 20, which is indicated in the load information LINF, is the predetermined threshold or less, the control unit 18 determines the type of the job JB as a low-load type.

When determining the type of the job JB as the high-load type based on the load information LINF, the control unit 18 inputs the job JB via the job input unit 10 to the physical calculation node 20 coupled to the input-output device 22 by the configuration change unit 16. When determining the type of the job JB as the low-load type based on the load information LINF, the control unit 18 inputs the job JB via the job input unit 12 to any of the virtual calculation nodes 26 obtained by virtualizing the physical calculation node 20 coupled to the input-output device 22 by the configuration change unit 16. For example, the physical calculation node 20 that executes the job JB of high-load type is different from the physical calculation node 20 including the virtual calculation node 26 that executes the job JB of low-load type.

In the information processor 200, each of the physical calculation nodes 20 is a computer such as a server including an arithmetic processor that performs calculation, and executes the job JB inputted from the job input unit 10. Each of the physical calculation nodes 20 further executes a virtualization program according to an instruction from the controller 100, thereby activating the virtual calculation nodes 26. In FIG. 1, broken-line frames representing the virtual calculation nodes 26 indicate that the virtual calculation nodes 26 can be activated and terminated in each of the physical calculation nodes 20. The number of the virtual calculation nodes 26 activated by each of the physical calculation nodes 20 is decided according to an instruction from the control unit 18.

The input-output device 22 is a memory such as a hard disk drive or a solid state drive, and is coupled to any one of the physical calculation nodes 20 via the switch device 24. The number of the input-output devices 22 coupled to the switch device 24 is not limited to one and may be two or more. The input-output device 22 coupled to the physical calculation node 20 via the switch device 24 stores information such as data handled by the physical calculation nodes 20 or the virtual calculation nodes 26. The input-output device 22 may store a program executed by the physical calculation node 20 or the virtual calculation nodes 26. Two or more input-output devices 22 may be coupled to the switch device 24. The information processor 200 may include a memory coupled to the switch device 24 via the input-output device 22. In this case, the input-output device 22 functions as a controller for controlling the memory.

According to an instruction from the configuration change unit 16, the switch device 24 couples the input-output device 22 to any one of the physical calculation nodes 20, or terminates the coupling between the input-output device 22 and the physical calculation node 20. Thereby, the switch device 24 can change coupling of the input-output device 22 to a certain one of the physical calculation nodes 20 to coupling of the input-output device 22 to another one of the physical calculation nodes 20.

In the information processing system SYS1 illustrated in FIG. 1, the controller 100 instructs the physical calculation node 20 to execute a job JB of high-load type, and instructs the virtual calculation nodes 26 activated in the physical calculation nodes 20 to execute a job JB of low-load type. For example, in the case where a job JB of low-load type is to be executed by multiple virtual calculation nodes 26 in parallel, multiple virtual calculation nodes 26 activated in one physical calculation node 20 can execute the job JP of low-load type. That is, if one physical calculation node 20 is free, the job JB of low-load type can be executed by multiple virtual calculation nodes 26. During execution of a job JB of low-load type, a larger number of physical calculation nodes 20 remain unused than in the conventional case. Thus, there are more chances to input a job JB to be executed by the multiple physical calculation nodes 20 in parallel than in the conventional case. Consequently, the controller 100 may be able to achieve a reduction in a wait time until a job JB received by the control unit 18 is inputted to the information processor 200 as compared with the conventional case. As a result, a time period from input of a job JB to the controller 100 until completion of the job JB can be made shorter than in the conventional case.

Data that is acquired as result of the execution of a job JB of low-load type and stored in the input-output device 22 may be used in a job JB of high-load type executed subsequent to the job JB of the low-load type. In this case, according to an instruction from the control unit 18, the configuration change unit 16 newly couples the input-output device 22 that holds the data acquired by executing the job JB of low-load type to the physical calculation node 20 that is to execute the job JB of high-load type. Thereby, the physical calculation node 20 executes the job JB without copying or transferring the data between the input-output devices, improving the execution efficiency of the job JB in the information processor 200, as compared with the conventional case. As a result, a time period from input of a job JB to the controller 100 until completion of the job JB can be made shorter than in the conventional case. Thus, in the case of executing jobs JB of plural types, the processing efficiency of the jobs JB is improved.

Figure 2:
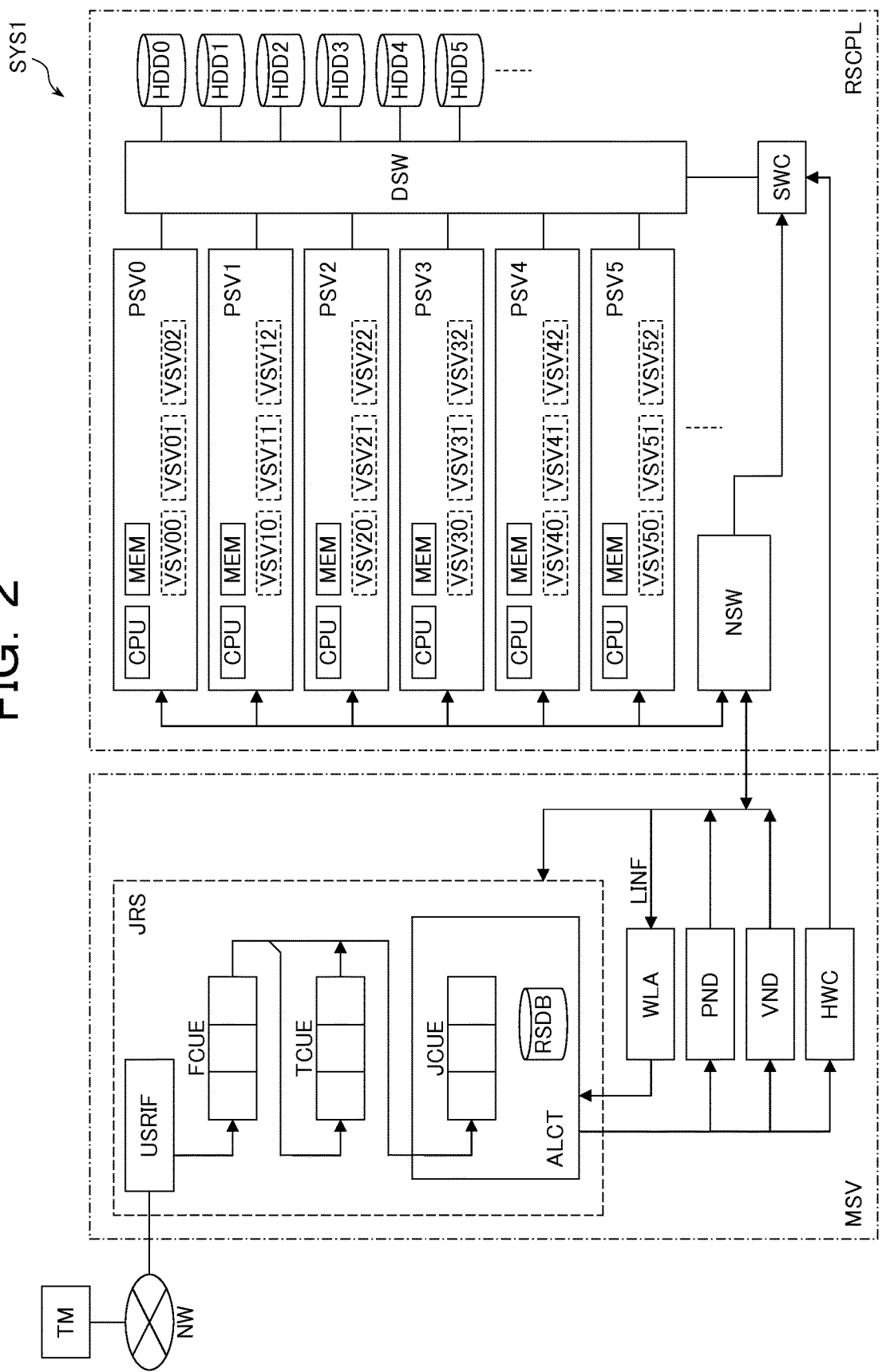
FIG. 2 illustrates another embodiment of the information processing system.

FIG. 2 illustrates another embodiment of the information processing system including a controller, and the method of controlling the information processing system. An information processing system SYS1 illustrated in FIG. 2 includes a management server MSV and a resource pool RSCPL.

The management server MSV has a scheduler JRS, a workload analysis unit WLA, a physical node deployment unit PND, a virtual node deployment unit VND, and a configuration change unit HWC. The management server MSV is coupled a terminal device TM via a network NW such as the Internet or an intranet. The management server MSV is an example of a controller for controlling the resource pool RSCPL. The management server MSV may be coupled to the terminal device TM without the network NW.

The resource pool RSCPL includes multiple physical servers PSV (PSV0, PSV1, PSV2, PSV3, PSV4, and PSV5), multiple hard disk drives HDD (HDD0, HDD1, HDD2, HDD3, HDD4, and HDD5), a switch device DSW, a switch control unit SWC, and a network switch NSW. The physical server PSV is an example of a physical calculation node, and the hard disk drive HDD is an example of the input-output device. The resource pool RSCPL is an example of the information processor having the physical servers PSV and the hard disk drives HDD.

The terminal device TM is included in a computer that causes the information processing system SYS1 to execute a job. According to an instruction inputted by the user via the terminal device TM, the information processing system SYS1 executes the job, and outputs an execution result of the job to the terminal device TM. The multiple terminal devices TM may be coupled to the information processing system SYS1 via the network NW.

The scheduler JRS has a user interface USRIF, a front queue FCUE, a test queue TCUE, and a job allocation unit ALCT. The job allocation unit ALCT has a job queue JCUE and a resource database RSDB.

The user interface USRIF receives the job from the terminal device TM, converts the received job into a data format such as Java_Script Object Notation (JSON; JavaScript is a registered trademark), and transfers the data format to the front queue FCUE. The user interface USRIF transmits the execution result of the job to the terminal device TM. For example, the user interface USRIF is embodied as a graphical user interface (GUI) running on a web browser. The user that operates the terminal device TM transmits the job to the information processing system SYS1, and receives the execution result of the job by use of a GUI screen displayed on the terminal device TM.

The front queue FCUE sequentially holds multiple jobs sent from the terminal device TM, and sequentially transfers the jobs to the test queue TCUE and the job queue JCUE. While the jobs held by the job queue JCUE are tentatively executed to acquire the load information LINF, the test queue TCUE holds the same jobs as the tentatively executed jobs. The job queue JCUE is an example of a first holding unit for holding the jobs inputted to the information processor 200, and the test queue TCUE is a second holding unit for holding the jobs inputted to the information processor 200. In FIG. 2, the front queue FCUE, the test queue TCUE, and the job queue JCUE each have three areas in which the jobs are held, and the number of areas is not limited to three.

Using the resource database RSDB, the job allocation unit ALCT manages resources (physical servers PSV and the hard disk drives HDD) in the resource pool RSCPL. The job allocation unit ALCT updates the resource database RSDB according to the management state of the resources in the resource pool RSCPL. Based on the job type determined by the workload analysis unit WLA, the job allocation unit ALCT determines whether the jobs held in the job queue JCUE are executed by the physical servers PSV or virtual servers VSV. Then, the jobs transferred from the test queue TCUE to the job queue JCUE are inputted to the resource pool RSCPL according to the determined type.

When the job is to be executed by the physical servers PSV, the job allocation unit ALCT causes the physical node deployment unit PND to deploy the physical servers PSV, and inputs the job to the deployed physical servers PSV via the physical node deployment unit PND. When the job is to be executed by the virtual servers VSV, the job allocation unit ALCT causes the virtual node deployment unit VND to deploy the virtual servers VSV, and inputs the job to the deployed virtual servers VSV via the virtual node deployment unit VND. The job allocation unit ALCT also issues an instruction to couple the physical servers PSV (or virtual servers VSV) and the hard disk drives HDD for execution of the job to the configuration change unit HWC.

Figure 4:
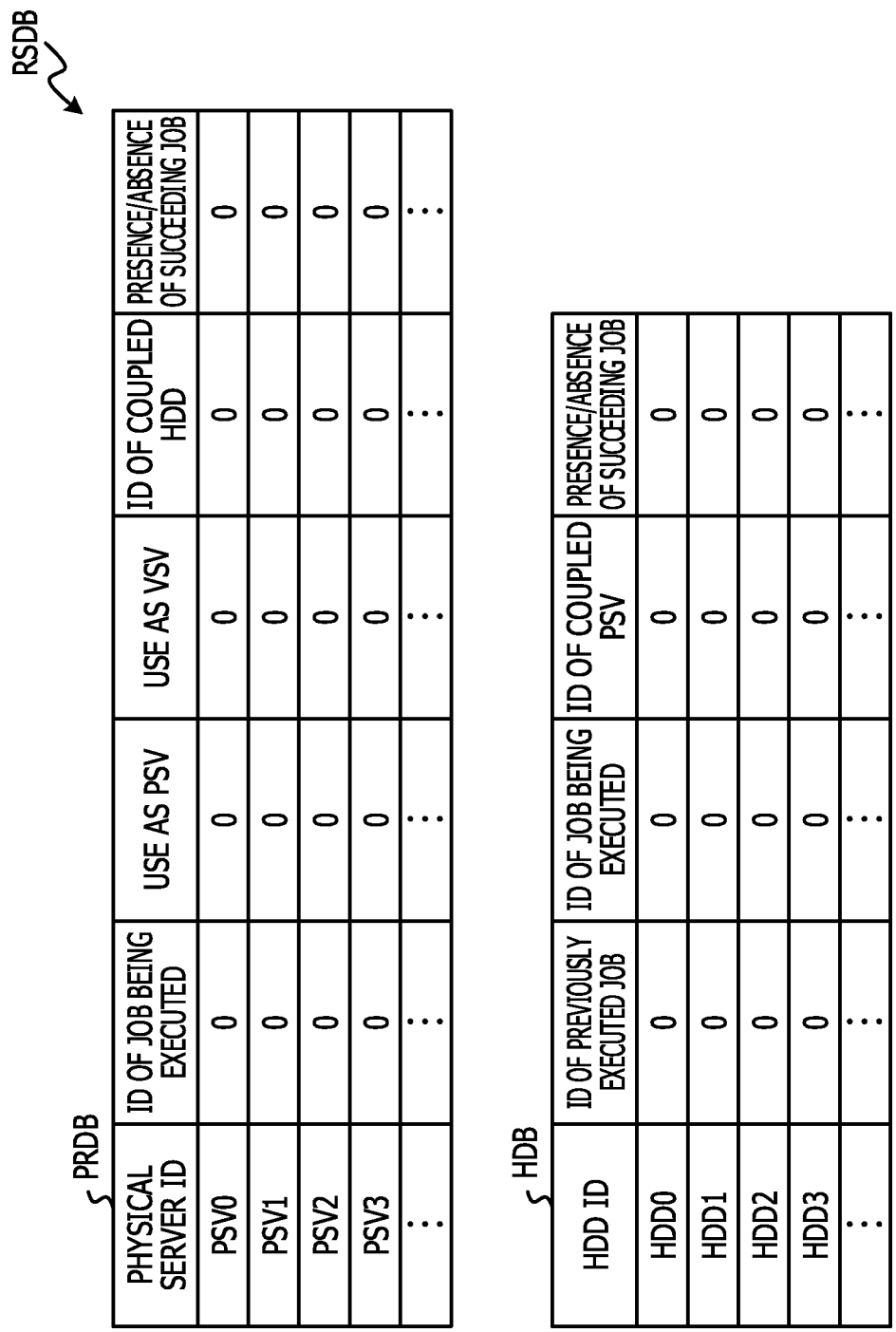
FIG. 4 illustrates an example of a resource database illustrated in FIG. 2.

The resource database RSDB is managed by the job allocation unit ALCT, and holds information on the usage state of the physical servers PSV and the usage state of the hard disk drives HDD. FIG. 4 illustrates an example of the resource database RSDB.

The workload analysis unit WLA receives the load information LINF indicating the load of the physical server PSV that tentatively executes the job from the physical server PSV, and determines the job type based on the load information LINF. For example, the load information LINF indicates a usage ratio of the CPU mounted in the physical server PSV. The workload analysis unit WLA determines the job type as the high-load type when the usage ratio of the CPU exceeds a predetermined threshold, and determines the job type as the low-load type when the usage ratio of the CPU is the predetermined threshold or less. The workload analysis unit WLA is an example of a monitor unit for monitoring the load information LINF indicating the load of the physical server PSV into which the job is inputted. It is noted that the workload analysis unit WLA may be included in the scheduler JRS.

The physical node deployment unit PND deploys a predetermined number of physical servers PSV in the resource pool RSCPL according to an instruction from the job allocation unit ALCT, and inputs jobs sent from the job allocation unit ALCT to the deployed physical servers PSV. The deployment of the physical servers PSV described herein means that a predetermined number of physical servers PSV for executing jobs are selected from unused physical servers PSV. When the unused physical servers PSV are not activated, the physical node deployment unit PND may have a function of activating the selected physical servers PSV. For example, a part of the function of the physical node deployment unit PND may be achieved by Ironic of OpenStack (registered trademark). The physical node deployment unit PND is an example of a first job input unit for inputting a job to one of the multiple physical servers PSV.

The virtual node deployment unit VND deploys a predetermined number of virtual servers VSV in the instructed physical servers PSV according to an instruction of the job allocation unit ALCT, and inputs jobs sent from the job allocation unit ALCT to the deployed virtual servers VSV. The deployment of the virtual servers VSV described herein means that the predetermined number of virtual servers VSV (software) for executing jobs are activated in one of the unused physical servers PSV. When the unused physical servers PSV are not activated, the virtual node deployment unit VND may have a function of activating one of the unused physical servers PSV. For example, a part of the function of the virtual node deployment unit VND may be achieved by Heat having an orchestration function in OpenStack. The virtual node deployment unit VND is an example of a second job input unit for inputting jobs to virtual servers VSV as virtualization of one of the multiple physical servers PSV.

According to an instruction from the job allocation unit ALCT, the configuration change unit HWC controls the switch control unit SWC in the resource pool RSCPL, and couples a predetermined physical server PSV to a predetermined hard disk drive HDD.

In the resource pool RSCPL, each of the physical servers PSV has an arithmetic processor such as a CPU and a main memory MEM such as a Dynamic random access memory (DRAM). Each of the physical servers PSV may have the hard disk drive HDD that stores software such as operating system (OS). In this case, even the physical server PSV that is not coupled to the hard disk drive HDD through the switch device DSW can remain activated by using the internal hard disk drive HDD. The number of physical servers PSV mounted in the resource pool RSCPL is not limited to six. In FIG. 2, the virtual servers VSV expressed in broken-line frames in each physical server PSV can be activated in the physical server PSV. In a two-digit figure added to the end of the virtual server VSV, the left figure indicates the number of the physical server PSV, and the right figure indicates an identification number of the virtual server VSV in the physical server PSV. It is noted that the number of the virtual servers VSV that can be activated in each physical server PSV is not limited to three.

The switch control unit SWC controls the switch device DSW according to an instruction sent from the configuration change unit HWC via the network switch NSW. According to an instruction from the switch control unit SWC, the switch device DSW couples one of the physical servers PSV to one of the hard disk drives HDD. The switch device DSW is an example of a switch unit for switching couplings between the multiple physical servers PSV and the hard disk drives HDD according to an instruction from the configuration change unit 16. The switch device DSW may be embodied as dedicated hardware or a storage area network (SAN).

The resource pool RSCPL may include memories such as solid state drives in place of the hard disk drives HDD, or may include both the hard disk drives and solid state drives. The number of the hard disk drives HDD mounted in the resource pool RSCPL is not limited to six.

The network switch NSW couples the physical servers PSV, the switch control unit SWC, the scheduler JRS, the workload analysis unit WLA, the physical node deployment unit PND, the virtual node deployment unit VND, and the configuration change unit HWC. For example, in the case where the physical servers PSV, the switch control unit SWC, and the management server MSV are coupled via a local area network (LAN), the network switch NSW is a LAN switch.

Figure 3:
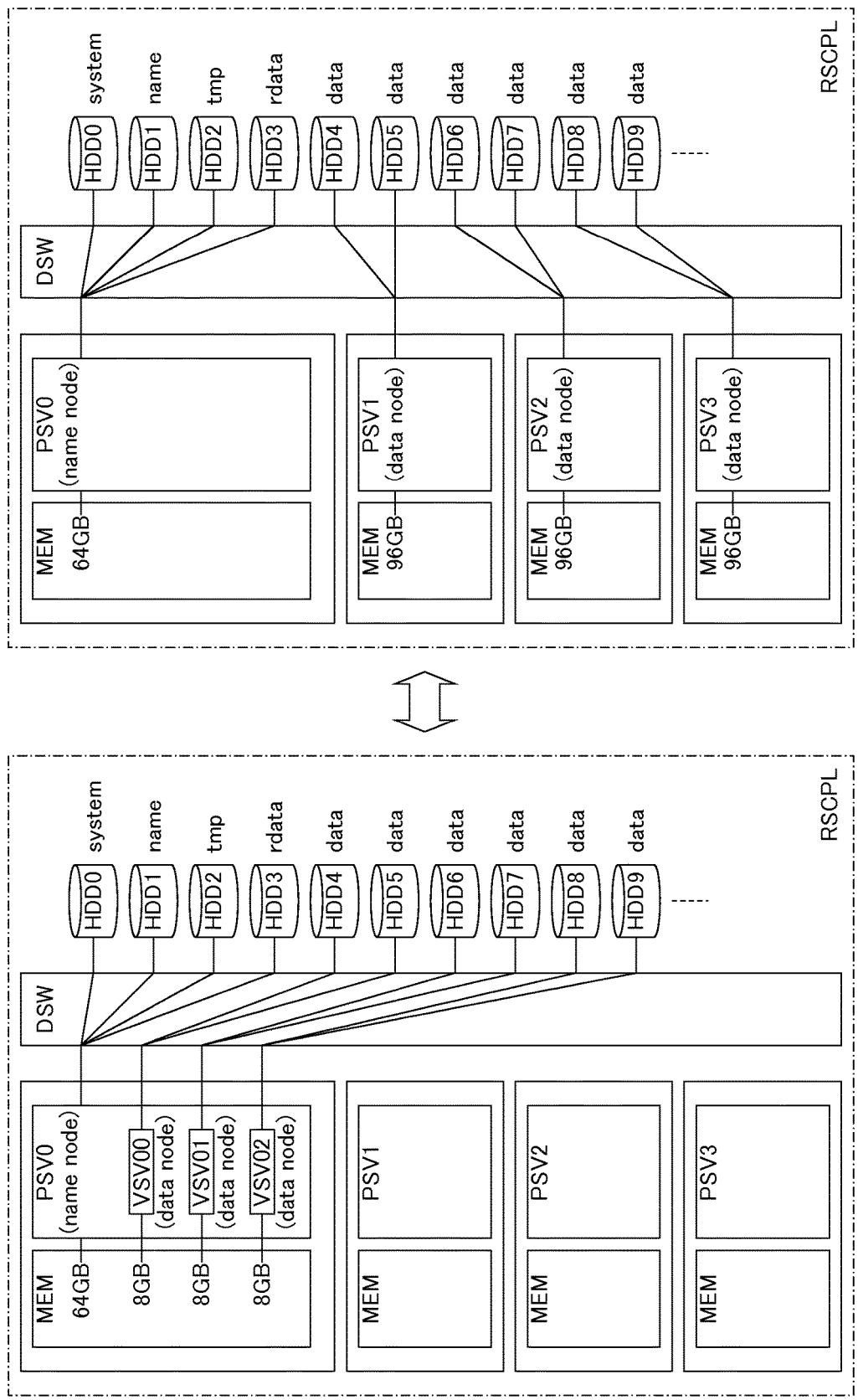
FIG. 3 illustrates an example of configuration of an information processor for each job type in the information processing system illustrated in FIG. 2.

FIG. 3 illustrates an example of configuration of the resource pool RSCPL for each job type in the information processing system SYS1 illustrated in FIG. 2. The left side in FIG. 3 illustrates a configuration example of the resource pool RSCPL in the case of executing a job mainly for access to the hard disk drives HDD. The right side in FIG. 3 illustrates a configuration example of the resource pool RSCPL in the case of executing a job mainly for data processing (arithmetic processing) of the CPU.

The job mainly for access to the hard disk drives HDD exerts a smaller load on the CPU than the job mainly for data processing of the CPU. That is, the left side in FIG. 3 illustrates the configuration of the resource pool RSCPL in the case of executing the job of low-load type in which the usage ratio of the CPU is a predetermined threshold or less. The right side in FIG. 3 illustrates the configuration of the resource pool RSCPL in the case of executing the job of high-load type in which the usage ratio of the CPU exceeds the predetermined threshold.

FIG. 3 illustrates an example in which Hadoop (registered trademark) for distributed processing for large scale data, which was developed by Apache Software Foundation (Apache is a registered trademark), operates. For example, when Mahout (registered trademark) runs on Hadoop to perform machine learning, the job of low-load type is executed and then, the job of high-load type is executed.

In executing the job of low-load type, the physical server PSV0 operates as a namenode that manages data in a file system. The virtual servers VSV00 to VSV02 operate as datanodes that input and output processed data from and to the hard disk drives HDD4 to HDD9. When the job of low-load type is executed by the physical server PSV0 and the virtual servers VSV00 to VSV02, the physical server PSV0 and the virtual servers VSV00 to VSV02 share the main memory MEM mounted in the physical server PSV0.

In executing the job of high-load type, the physical server PSV0 operates as a namenode that manages data in a file system. The physical servers PSV1 to PSV3 operate as datanodes that input and output processed data from and to the hard disk drives HDD4 to HDD9. When the job of high-load type is executed by the physical server PSV0 to PSV3, the physical server PSV0 to PSV3 executes the job by using the respective internal main memories MEM. "64 GB" and "96 GB" in the main memories MEM indicate memory capacity allocated to each node.

In FIG. 3, the hard disk drives HDD0, HDD1, and HDD2, to which system, name, tmp are allocated, respectively, are used by the physical server PSV that operates as a parent node. The hard disk drives HDD3, to which area rdata is allocated, holds data (raw data) before distribution into the hard disk drives HDD4 to HDD9. The hard disk drives HDD3, into which area data is allocated, holds data distributed by the virtual servers VSV00 to VSV02 as child nodes or the physical servers PSV1 to PSV3. The number and use of the hard disk drives HDD coupled to the physical server PSV0 to PSV3 are not limited to ones illustrated in FIG. 3.

FIG. 4 illustrates an example of the resource database RSDB illustrated in FIG. 2. The resource database RSDB includes a physical resource database PRDB and a disk resource database HDB. The physical resource database PRDB and the disk resource database HDB are generated in an initialization sequence at building of the information processing system SYS1. The physical resource database PRDB and the disk resource database HDB in FIG. 4 illustrates an initial state generated at building of the information processing system SYS1.

The physical resource database PRDB has areas that store information on "ID of job being executed", the area of "use as PSV", and "use as VSV" for each identification (ID) of the physical servers PSV. The physical resource database PRDB also has areas that store information on "ID of coupled HDD" and "presence/absence of succeeding job" for each identification (ID) of the physical servers PSV.

When no job being executed is present, "0" is stored in the area of "ID of job being executed" and when a job is being executed, a job ID is stored in the area of "ID of job being executed". When no physical server is used as PSV, "0" is stored in the area of "use as PSV" and when a physical server is used as PSV, "1" is stored in the area of "use as PSV". When no virtual server VSV is used, "0" is stored in the area of "use as VSV" and when a virtual server VSV is used, an ID of the used virtual server VSV is stored in the area of "use as VSV".

When no hard disk drive HDD is coupled, "0" is stored in the area of "ID of coupled HDD" and when a hard disk drive HDD is coupled, an ID of the coupled hard disk drive HDD is stored in the area of "ID of coupled HDD". When no succeeding job is present, "0" is stored in the area of "presence/absence of succeeding job", and when a succeeding job is present, "1" is stored in the area of "presence/absence of succeeding job".

The disk resource database HDB has areas that store information on "ID of previously executed job", "ID of job being executed", "ID of coupled PSV", and "presence/absence of succeeding job" for each ID of the hard disk drives HDD.

The area of "ID of previously executed job" stores an ID of a job previously executed out of multiple jobs dependent on each other if the multiple jobs are executed. The area of "ID of previously executed job" indicates that the job execution result is held in the hard disk drive HDD. When no job being executed is present, "0" is stored in the area of "ID of job being executed", and when a job is being executed, an ID of the job is stored in the area of "ID of job being executed". When no physical server PSV is coupled, "0" is stored in the area of "ID of coupled PSV", and when a physical server PSV is coupled, an ID of the coupled physical server PSV is stored in the area of "ID of coupled PSV". When no succeeding job is present, "0" is stored in the area of "presence/absence of succeeding job", and when a succeeding job is present, "1" is stored in the area of "presence/absence of succeeding job".

FIGS. 5A and 5B, FIGS. 6A and 6B, FIG. 8, and FIGS. 10A and 10B to FIG. 14 illustrate examples of the operation of the information processing system SYS1 illustrated in FIG. 2. For convenience of description, FIGS. 5A and 5B, FIGS. 6A and 6B, FIG. 8, and FIGS. 10A and 10B to FIG. 14 illustrate only elements used to describe the operation. In FIGS. 5A and 5B, FIGS. 6A and 6B, FIG. 8, and FIGS. 10A and 10B to FIG. 14, symbols A0, A1, and A2 in the front queue FCUE, the test queue TCUE, and the job queue JCUE are jobs that are dependent on one another. For convenience of description, in FIGS. 5A and 5B, and FIGS. 6A and 6B, the job of low-load type A0 is represented as a chamfered square, and the jobs of high-load type A1 and A2 are represented as circles. However, the type of each of the jobs A0 to A2 is not identified before the type determination test is made.

The jobs A0, A1, and A2 are stored in the front queue FCUE in this order. The job A1 uses the execution result of the job A0, and the job A2 uses the execution result of the job A1.

For example, it is given that processing executed by the jobs A0, A1, and A2 is Hadoop processing. It is noted that the processing executed by the jobs A0, A1, and A2 may be distributed processing other than Hadoop processing. The elements expressed as thick-line frames in each operation are main elements of the operation. In FIGS. 5A and 5B, FIGS. 6A and 6B, FIG. 8, and FIGS. 10A and 10B to FIG. 14, for convenience of description, it is given that during processing of the jobs A0 to A2, another job unrelated to the jobs A0 to A2 is not inputted.

Figure 5A:
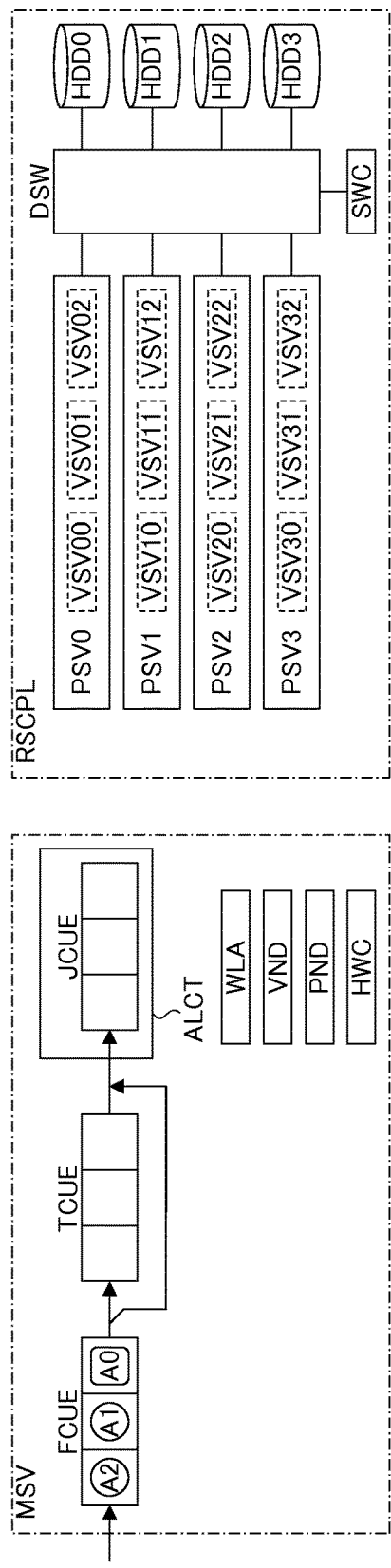
FIGS. 5A and 5B illustrate an example of an operation of the information processing system illustrated in FIG. 2.

First, in FIG. 5A, the management server MSV sequentially receives the jobs A0 to A2 from the terminal device TM, and stores the received jobs A0 to A2 in the front queue FCUE. For example, the user who operates the terminal device TM of the information processing system SYS1 illustrated in FIG. 2 selects Hadoop processing with the user interface USRIF (GUI screen). Then, the user sets parameters to be used to execute Hadoop processing with the user interface USRIF. Here, examples of the parameters include the number of namenodes, the number of datanodes, the number of tasks of map processing, the number of tasks of reduce processing, and task heap size. In FIG. 5A, the physical servers PSV in the resource pool RSCPL do not operate, and are not coupled to any hard disk drive HDD.

Figure 5B:
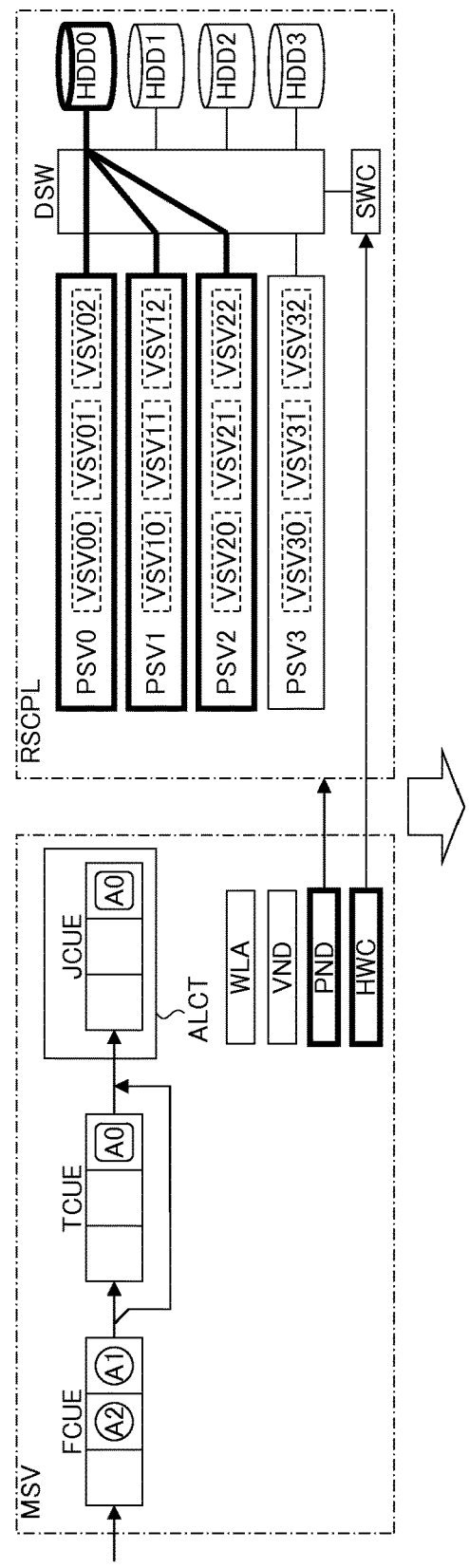

Next, in FIG. 5B, the management server MSV transfers the job A0 in the front queue FCUE to the test queue TCUE and the job queue JCUE. The job A0 stored in the test queue TCUE is transferred to the job queue JCUE after completion of the type determination test that determines the job type, and is executed by the physical server PSV or the virtual server VSV. That is, the job A0 held in the test queue TCUE indicates the presence of the job executed after completion of the type determination test.

Since the test queue TCUE and the job queue JCUE hold the common job A0, the job A0 used to perform the type determination test may not be lost, and become executable again after the completion of the type determination test. In place of providing the test queue TCUE, there may be provided a flag that is to be set while the type determination test is made, and the job in the job queue JCUE used for the type determination test is kept from being deleted while the flag is set.

To perform the type determination test for the job A0, the job allocation unit ALCT instructs the physical node deployment unit PND to deploy the physical servers PSV0 to PSV2 in the resource pool RSCPL. To perform the type determination test for the job A0, the job allocation unit ALCT instructs the configuration change unit HWC to allow the switch control unit SWC to couple the physical servers PSV0 to PSV2 to the hard disk drive HDD0.

The physical servers PSV deployed here are selected from among the physical servers PSV having "0" in the areas of "use as PSV" and "use as VSV" in the physical resource database PRDB illustrated in FIG. 4. The used hard disk drives HDD are selected from among the hard disk drives HDD having "0" in the areas of "ID of coupled PSV" and "presence/absence of succeeding job" in the disk resource database HDB illustrated in FIG. 4.

The number of the physical servers PSV (or virtual servers VSV) that are to execute a job in a distributed manner is set by the user using the terminal device TM. The number of used hard disk drives HDD may be set according to the quantity of data processed in the job by the job allocation unit ALCT, or may be set by the user using the terminal device TM. In FIGS. 5A and 5B, for convenience of description, although one hard disk drive HDD0 is coupled to the physical servers PSV0 to PSV2, the multiple hard disk drives HDD may be coupled to the physical servers PSV0 to PSV2.

FIGS. 6A and 6B illustrate an example of the operation following the operation in FIGS. 5A and 5B. In FIG. 6A, the job allocation unit ALCT distributes the job A0 held in the job queue JCUE among the physical servers PSV0 to PSV2. Then, the job allocation unit ALCT causes the physical servers PSV0 to PSV2 to perform the type determination test for the job A0 by the distributed processing until a predetermined time (for example, a few minutes) elapses. The workload analysis unit WLA measures loads of CPUs of the physical servers PSV0 to PSV2. The loads of the CPUs (CPU usage ratio) are measured with a load monitor tool such as zabbix. The workload analysis unit WLA averages loads of the CPUs measured every certain period, and determines the type of the job A0 as the low-load type as an average value is a threshold or less.

It is noted that the job allocation unit ALCT detects the unused physical servers PSV by referring to the resource database RSDB in the type determination test, but does not update the resource database RSDB based on execution of the type determination test. For this reason, in FIG. 6A, the state of the resource database RSDB during execution of the type determination test is the same as the state in FIG. 4.

Next, in FIG. 6B, the scheduler JRS illustrated in FIG. 2 transfers the job A0 held in the test queue TCUE to the job queue JCUE. Based on the result of the type determination test, the job allocation unit ALCT issues an instruction to deploy the virtual servers VSV00, VSV11, and VSV02 in the resource pool RSCPL to the virtual node deployment unit VND. To execute the job A0 in the virtual servers VSV00, VSV11, VSV02, the job allocation unit ALCT instructs the configuration change unit HWC to allow the switch control unit SWC to couple the physical server PSV0 to the hard disk drive HDD0. Then, the job allocation unit ALCT updates the resource database RSDB.

Figure 7A:
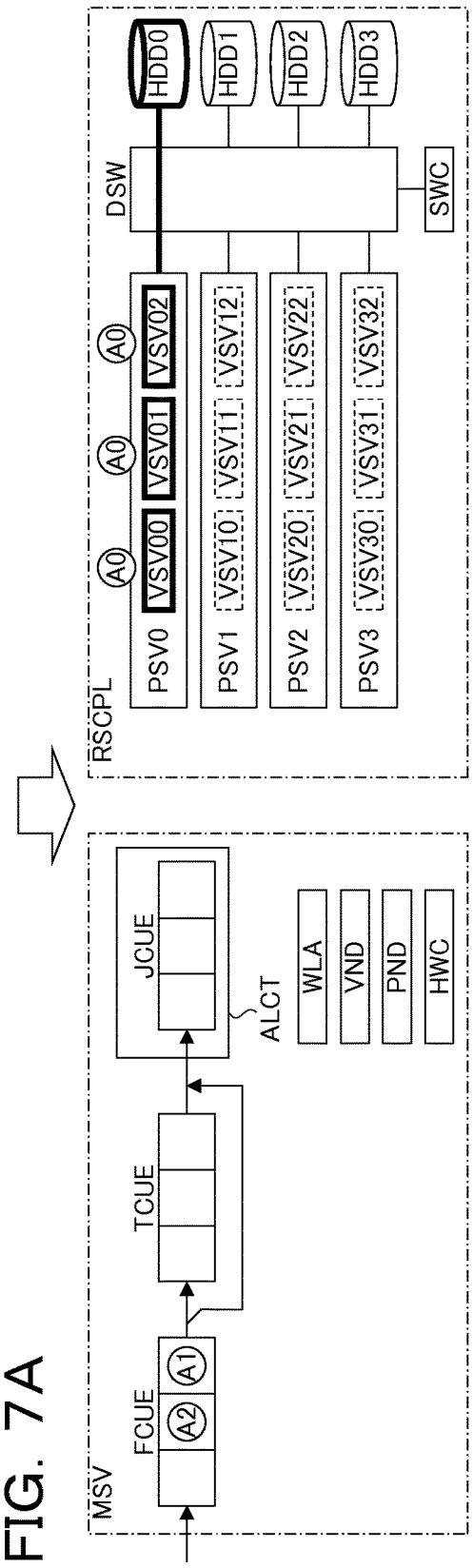
FIGS. 7A and 7B illustrate an example of the operation following the operation illustrated in FIGS. 6A and 6B.
Figure 7B:
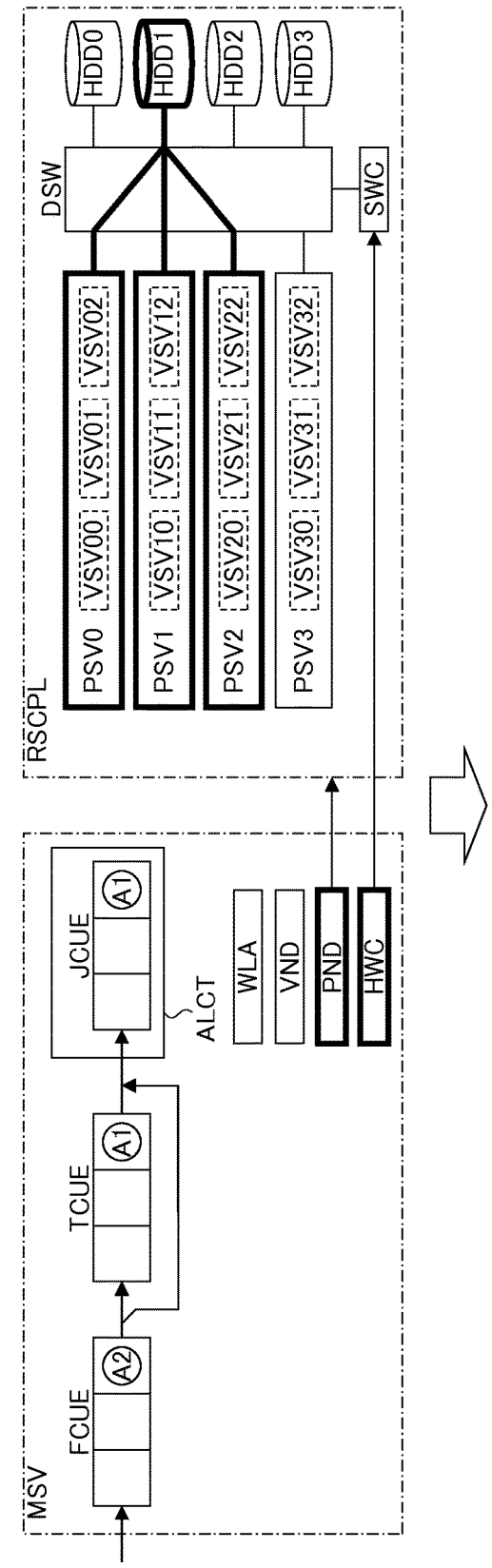

FIGS. 7A and 7B illustrate an example of the operation following the operation in FIGS. 6A and 6B. In FIG. 7A, the job allocation unit ALCT distributes the job A0 held in the job queue JCUE among the virtual servers VSV00, VSV01, and VSV02. Then, the job allocation unit ALCT causes the physical servers PSV0 to PSV2 to execute the job A0 by distributed processing. Data acquired by executing the job A0 is stored in the hard disk drive HDD0.

Since the type of the job A0 is the low-load type, a processing time of the virtual servers VSV00 to VSV02 is equal to a processing time of the physical servers PSV0 to PSV2. Since the job A0 is executed by the virtual servers VSV00 to VSV02 rather than the physical servers PSV0 to PSV2, other jobs unrelated to the job A0 (including the type determination test) can be executed by other free physical servers PSV. By executing the job of low-load type by using the virtual servers VSV in this manner, the usage efficiency of the physical servers PSV in the resource pool RSCPL is improved, enhancing the job processing efficiency. In other words, the job processing efficiency is improved by determining whether the job is executed by the physical server PSV or the virtual server VSV based on the CPU usage ratio found by the type determination test. This can improve the performance of the information processing system SYS1.

In FIG. 7B, after execution of the job A0, the management server MSV transfers the job A1 in the front queue FCUE to the test queue TCUE and the job queue JCUE. As in FIG. 5B, to perform the type determination test for the job A1, the job allocation unit ALCT instructs the physical node deployment unit PND to deploy the physical servers PSV0 to PSV2. To perform the type determination test for the job A1, the job allocation unit ALCT also instructs the configuration change unit HWC to couple the physical servers PSV0 to PSV2 to the hard disk drive HDD1. At this time, based on information stored in the resource database PRDB, the job allocation unit ALCT does not allow the physical servers PSV0 to PSV2 to use the hard disk drive HDD0 that holds the execution result of the job A0.

FIG. 8 illustrates an example of the resource database RSDB that is executing the job of low-load type A0 in FIG. 7A. The job allocation unit ALCT stores information indicating that the virtual servers VSV00, VSV01, and VSV02 are deployed in the physical server PSV0 coupled to the hard disk drive HDD0 in the physical resource database PRDB. The job allocation unit ALCT also stores information indicating that the job A0 is executed in the physical resource database PRDB. Further, the job allocation unit ALCT stores information indicating that the physical server PSV0 including the virtual servers VSV00, VSV01, and VSV02 that execute the job A0 is coupled to the hard disk drive HDD0 in the disk resource database HDB. As illustrated in FIG. 8, information indicating the job A0 is stored in "ID of job being executed" in the disk resource database HDB, and information indicating the physical server PSV0 is stored in the "ID of coupled PSV". Since the jobs A1 and A2 related to the job A0 are executed after execution of the job A0, the job allocation unit ALCT stores "1" in the area of "presence/absence of succeeding job" corresponding to the physical server PSV0 and the hard disk drive HDD0.

After execution of the job A0, based on "1" stored in the area of "presence/absence of succeeding job", the job allocation unit ALCT stores information indicating the job A0 is stored in "ID of previously executed job" corresponding to the hard disk drive HDD0. Thereby, in FIG. 7B, the job allocation unit ALCT can couple the physical servers PSV0 to PSV2 to the hard disk drive HDD1 other than the hard disk drive HDD0 that holds the execution result of the job A0. After execution of the job A0, the job allocation unit ALCT sets "0" in the areas other than the area of "ID of previously executed job" that stores in information indicating the job A0 in the resource database RSDB.

Figure 9A:
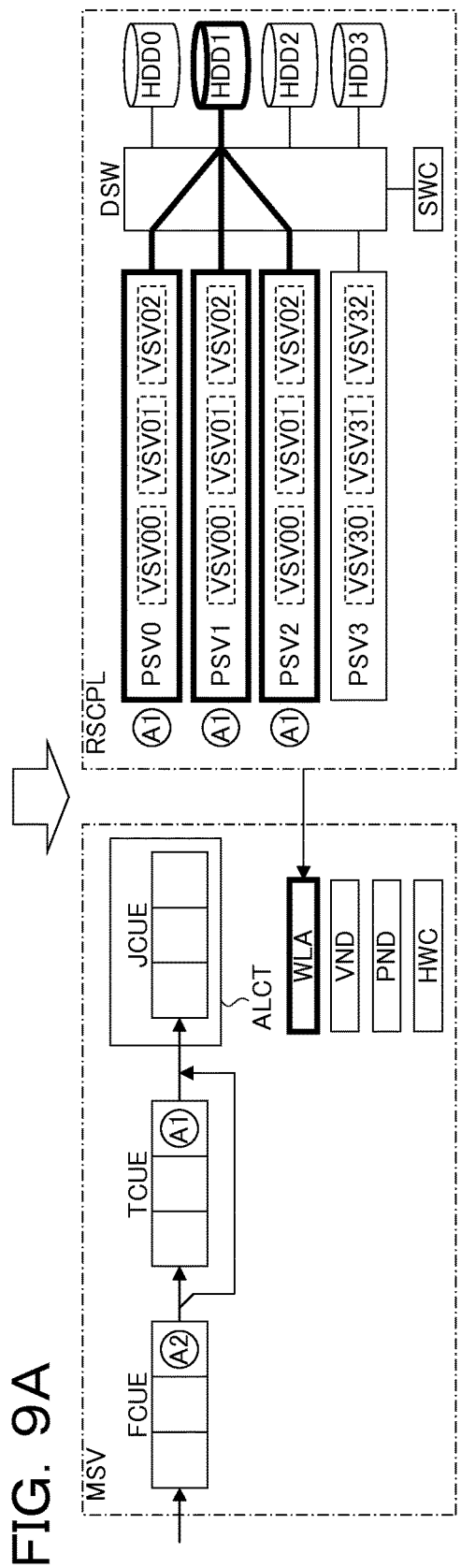
FIGS. 9A and 9B illustrate an example of the operation following the operation illustrated in FIGS. 7A and 7B.
Figure 9B:
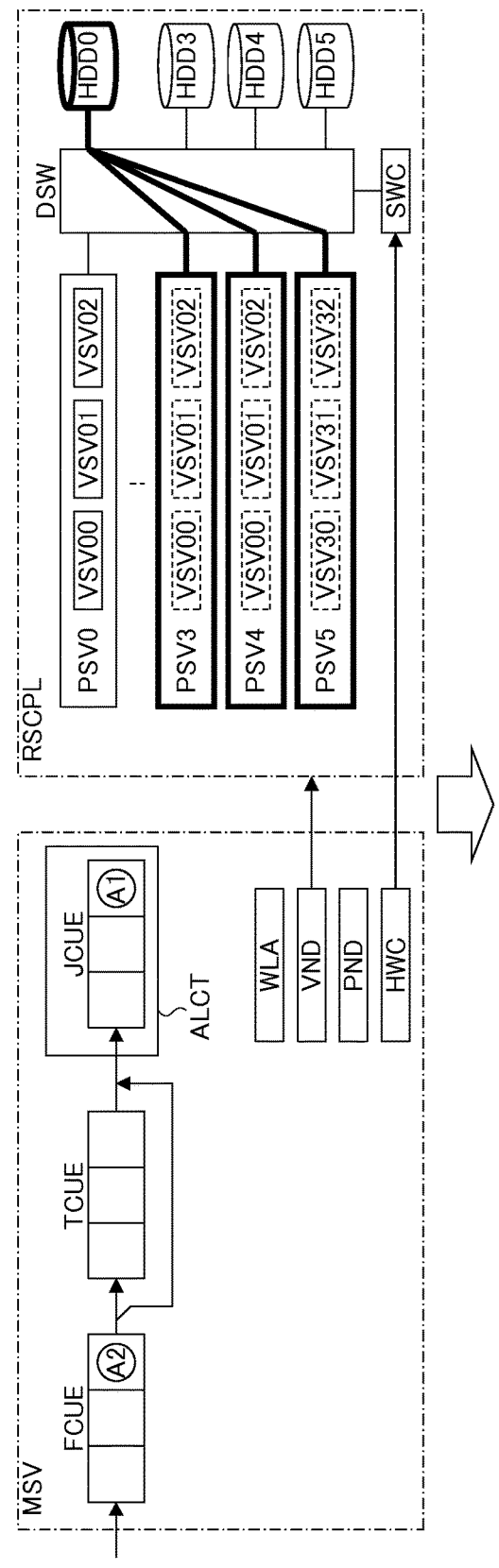

FIGS. 9A and 9B illustrate an example of the operation following the operation illustrated in FIGS. 7A and 7B. Detailed description of the same operation as the operation in FIGS. 6A and 6B is omitted. In FIG. 9A, the job allocation unit ALCT distributes the job A1 among the physical servers PSV0 to PSV2 to cause the physical servers PSV0 to PSV2 to perform the type determination test for the job A1 by distributed processing until a predetermined time elapses. The workload analysis unit WLA determines the type of the job A1 as the high-load type as an average value of the loads (usage ratio) of the CPUs that executes the job A1 exceeds a threshold.

Next, in FIG. 9B, to execute the job A1 transferred from the test queue TCUE to the job queue JCUE, the job allocation unit ALCT instructs the physical node deployment unit PND to deploy the physical servers PSV3, PSV4, and PSV5. Referring the physical resource database PRDB, the job allocation unit ALCT selects the physical servers PSV3, PSV4, and PSV5 from among the unused physical servers PSV. Further, to execute the job A1, the job allocation unit ALCT causes the configuration change unit HWC to couple the physical servers PSV3 to PSV5 to the hard disk drive HDD0 that holds the execution result of the job A0. The hard disk drive HDD0 that holds the execution result of the job A0 is detected by referring to the area of "ID of previously executed job" in the disk resource database HDB.

FIGS. 10A and 10B illustrate an example of the operation following the operation illustrated in FIGS. 9A and 9B. Detailed description of the same operation as the operation in FIGS. 7A and 7B is omitted. In FIG. 10A, the job allocation unit ALCT causes the physical servers PSV3 to PSV5 to execute the job A1 held in the job queue JCUE by distributed processing. Data acquired through execution of the job A1 is stored in the hard disk drive HDD0.

In FIG. 10B, after execution of the job A1, the management server MSV transfers the job A2 in the front queue FCUE to the test queue TCUE and the job queue JCUE. As in FIG. 7B, to perform the type determination test for the job A2, the job allocation unit ALCT instructs the physical node deployment unit PND to deploy the physical servers PSV0 to PSV2. To perform the type determination test for the job A2, the job allocation unit ALCT instructs the configuration change unit HWC to couple the physical servers PSV0 to PSV2 to the hard disk drive HDD1.

FIG. 11 illustrates an example of the resource database RSDB in the case where the job of high-load type A1 is being executed in FIG. 10A. The job allocation unit ALCT stores information indicating deployment of the physical servers PSV3 to PSV5 coupled to the hard disk drive HDD0 in the physical resource database PRDB. The job allocation unit ALCT also stores information indicating execution of the job A1 in the physical resource database PRDB. The job allocation unit ALCT stores information indicating that the physical servers PSV3 to PSV5 that execute the job A2 is coupled to the hard disk drive HDD0 in the disk resource database HDB. As illustrated in FIG. 11, information indicating the job A1 is stored in "ID of job being executed", and information indicating the physical servers PSV3 to PSV5 is stored in "ID of coupled PSV" in the disk resource database HDB. Further, since the job A2 related to the job A1 is executed after execution of the job A1, the job allocation unit ALCT stores "1" in the area of "presence/absence of succeeding job" corresponding to the physical servers PSV3 to PSV5 and the hard disk drive HDD0.

After execution of the job A1, based on "1" stored in the area of "presence/absence of succeeding job", the job allocation unit ALCT stores information indicating the job A1 in the "ID of previously executed job" corresponding to the hard disk drive HDD0. Thereby, in FIG. 10B, the job allocation unit ALCT can couple the physical servers PSV0 to PSV2 to the hard disk drive HDD1 other than the hard disk drive HDD0 that holds the execution result of the job A1. After execution of the job A1, the job allocation unit ALCT sets "0" in areas other than the area of "ID of previously executed job" that stores information indicating the job A1 in the resource database RSDB.

Figure 12A:
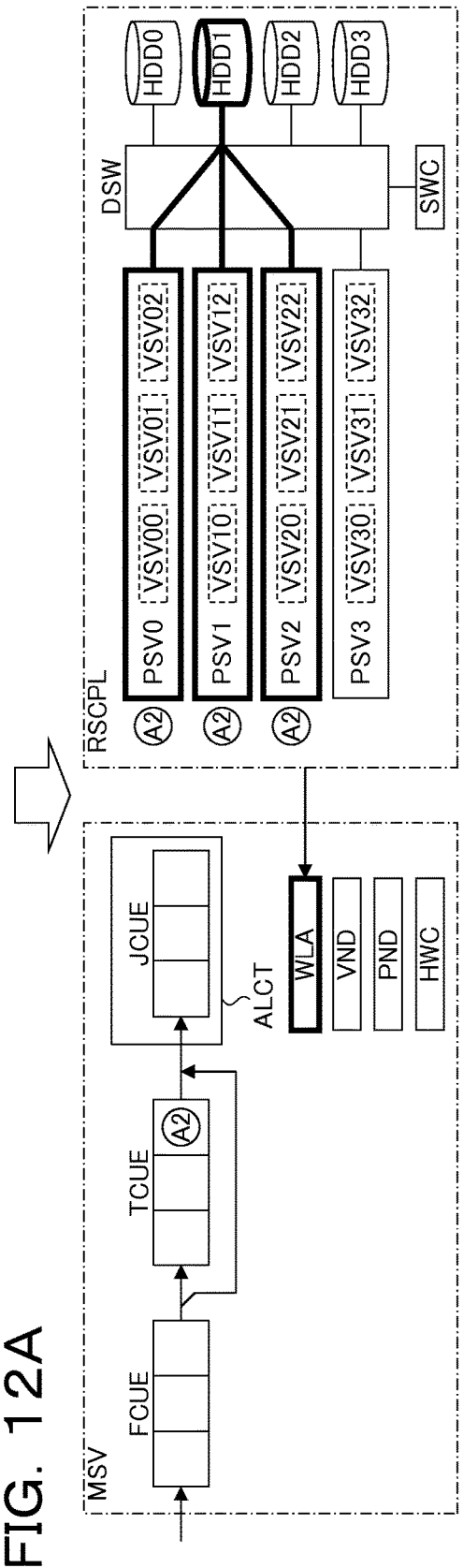
FIGS. 12A and 12B illustrate an example of the operation following the operation illustrated in FIGS. 10A and 10B.
Figure 12B:
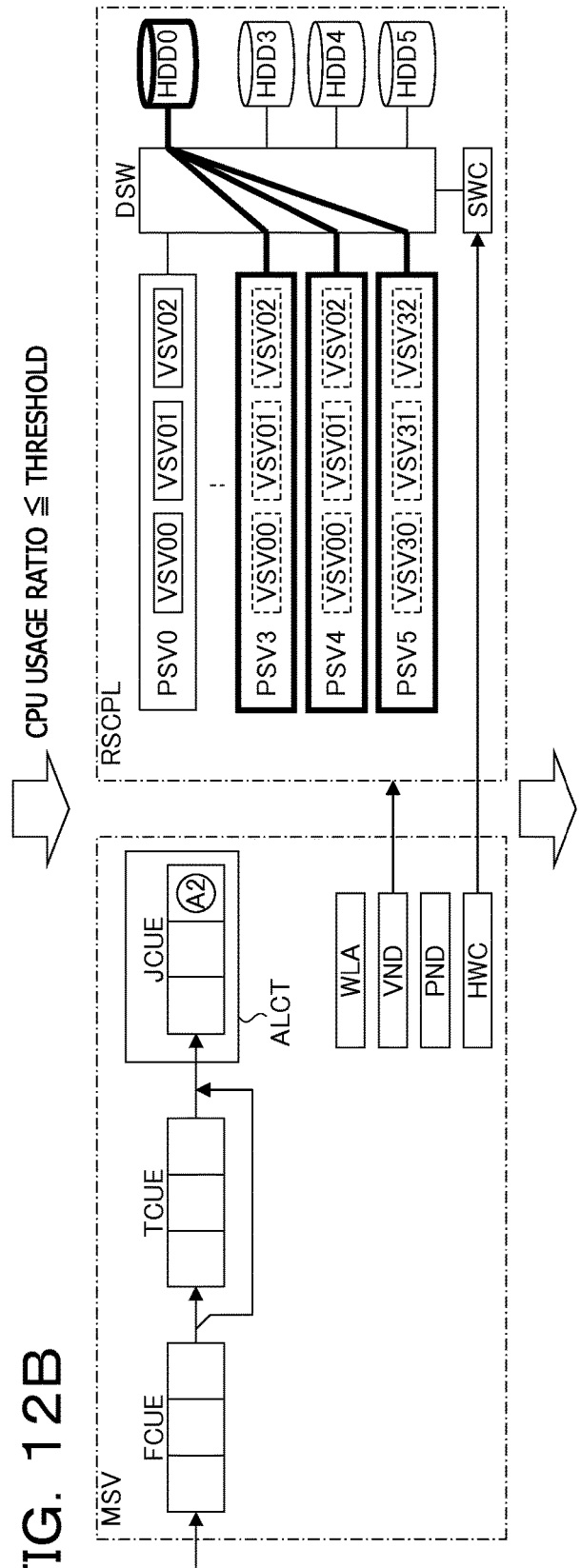

FIGS. 12A and 12B illustrate an example of the operation following the operation illustrated in FIGS. 10A and 10B. The operation in FIG. 12A is the same as the operation in FIG. 9A except that the type determination test for the job A2 in place of the job A1 is made. The operation in FIG. 12B is the same as the operation in FIG. 9B except that the job A2 in place of the job A1 is held in the job queue JCUE.

Figure 13:
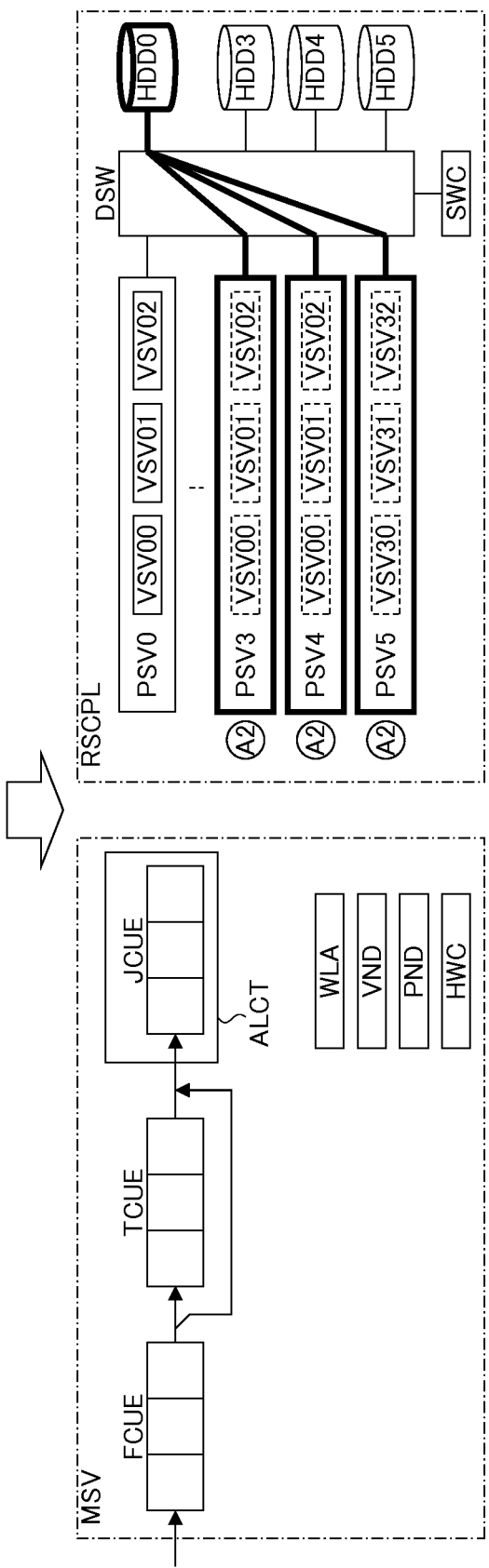
FIG. 13 illustrates an example of the operation following the operation illustrated in FIGS. 12A and 12B.

FIG. 13 illustrates an example of the operation following the operation illustrated in FIGS. 12A and 12B. The operation in FIG. 13 is the same as that in FIG. 10A except that the job A2 in place of the job A1 is executed.

Figure 14:
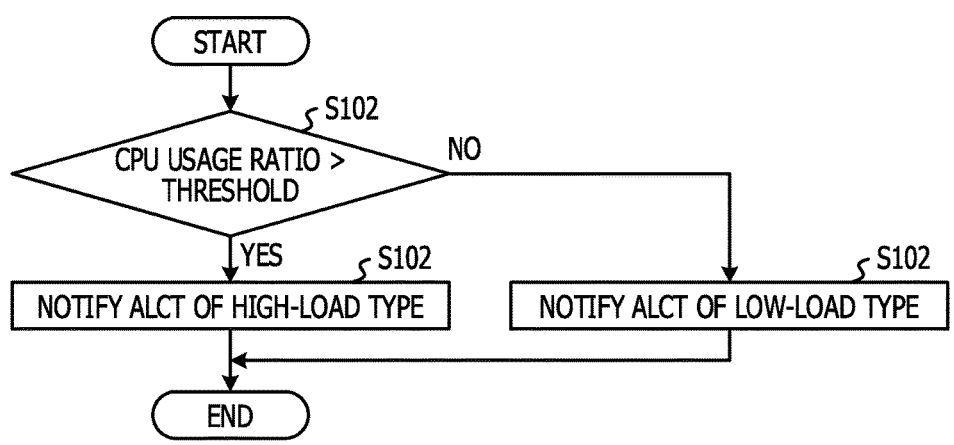
FIG. 14 illustrates an example of the operation of a workload analysis unit illustrated in FIG. 2.

FIG. 14 illustrates an example of the operation of the workload analysis unit WLA illustrated in FIG. 2. The operation in FIG. 14 is performed by the workload analysis unit WLA embodied as a program executed by the management server MSV, or hardware of the workload analysis unit WLA of the management server MSV.

First, in Step S102, the workload analysis unit WLA determines whether or not the usage ratio (average value) of the CPU of the physical servers PSV that is executing the type determination test exceeds a threshold. For example, the threshold is 10%. When the usage ratio of the CPU exceeds the threshold, the operation proceeds to Step S104, and when the usage ratio of the CPU is the threshold or less, the operation proceeds to Step S106.

In Step S104, the workload analysis unit WLA notifies the job allocation unit ALCT that the type of the job is the high-load type, and finishes the operation. In Step S106, the workload analysis unit WLA notifies the job allocation unit ALCT that the type of the job is the low-load type, and finishes the operation.

Figure 15:
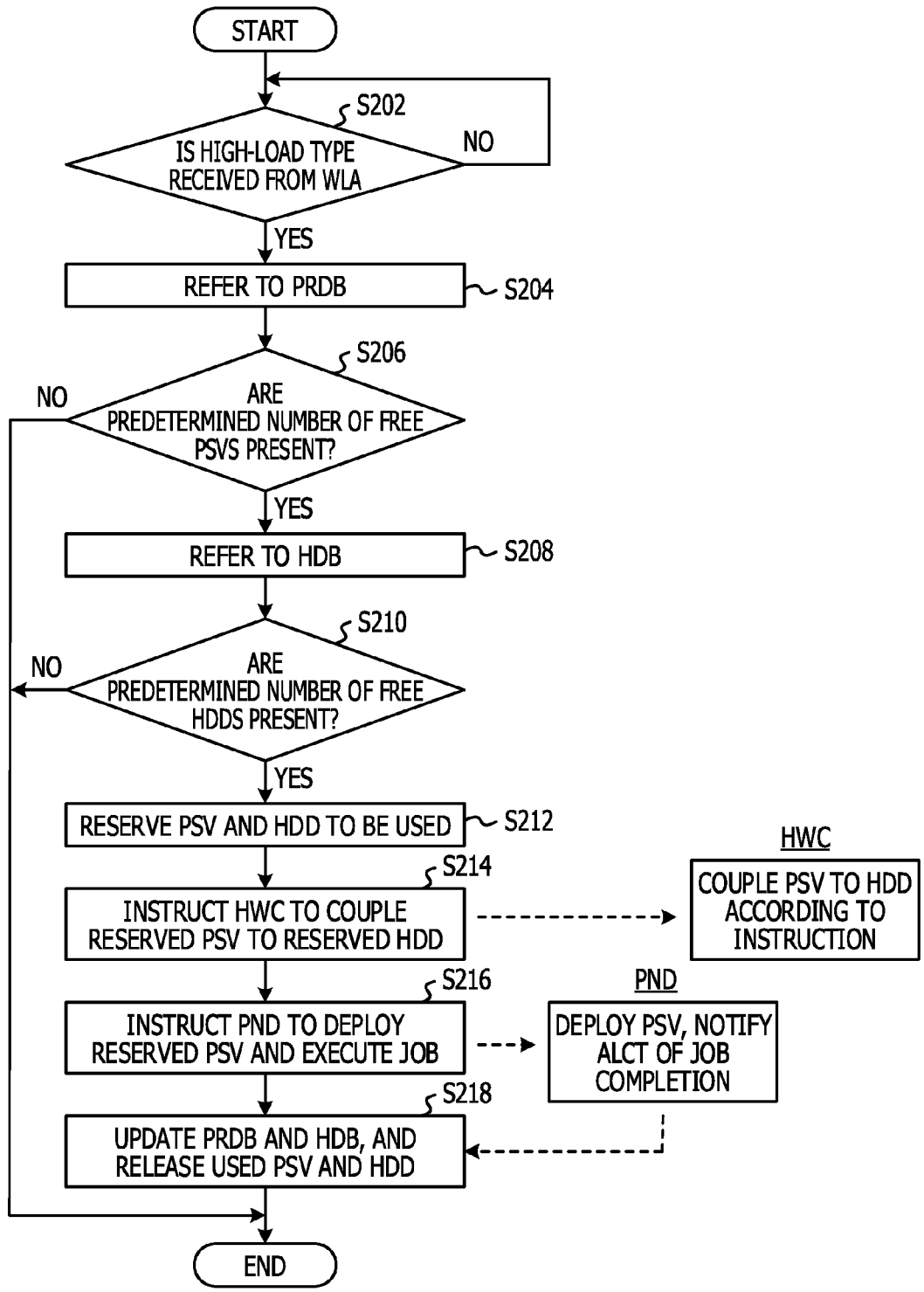
FIG. 15 illustrates an example of the operation of a job allocation unit illustrated in FIG. 2.

FIG. 15 illustrates an example of the operation of the job allocation unit ALCT illustrated in FIG. 2. The operation in FIG. 15 is performed by the job allocation unit ALCT embodied as a program executed by the management server MSV, or hardware of the job allocation unit ALCT of the management server MSV. FIG. 15 also illustrates an example of the operation of the physical node deployment unit PND and the configuration change unit HWC which operate according to an instruction from the job allocation unit ALCT. The physical node deployment unit PND and the configuration change unit HWC each may be embodied as a program executed by the management server MSV, or as hardware.

First, in Step S202, the job allocation unit ALCT determines whether or not the job allocation unit ALCT receives information indicating that the job is the high-load type from the workload analysis unit WLA. When the information indicating the high-load type is received, the operation proceeds to Step S204, and when no information indicating the high-load type is received, Step S202 is repeated.

In Step S204, referring to the physical resource database PRDB, the job allocation unit ALCT detects free physical servers PSV. Next, in Step S206, the job allocation unit ALCT shifts the operation to Step S208 when a predetermined number of physical servers PSV are free, and finishes the operation the predetermined number of physical servers PSV are not free. The predetermined number described here denotes the number of physical servers PSV to be used in distributed processing to execute the job.

In Step S208, referring to the disk resource database HDB, the job allocation unit ALCT detects free hard disk drives HDD. Next, in Step S210, the job allocation unit ALCT shifts the operation to Step S212 when a predetermined number of hard disk drives HDD are free, and finishes the operation when the predetermined number of hard disk drives HDD are not free. The predetermined number described here denotes the number of hard disk drives HDD to be used to execute the job of high-load type.

In Step S212, the job allocation unit ALCT sequentially refers to the physical resource database PRDB, for example, from the top of entries, and reserves a predetermined number of physical servers PSV to be used to execute the job. Further, the job allocation unit ALCT sequentially refers to the disk resource database HDB, for example, from the top of entries, and reserves a predetermined number of hard disk drives HDD to be used to execute the job. When the job ID is stored in the area of "ID of previously executed job" in the disk resource database HDB, the job allocation unit ALCT selects the hard disk drive HDD corresponding to the area that stores the job ID. As in FIG. 11, based on securing of the physical servers PSV and the hard disk drives HDD, the job allocation unit ALCT updates the physical resource database PRDB and the disk resource database HDB.

Next, in Step S214, the job allocation unit ALCT instructs the configuration change unit HWC to couple the reserved physical server PSV to the reserved hard disk drive HDD. According to an instruction from the job allocation unit ALCT, the configuration change unit HWC controls the switch control unit SWC to couple the reserved physical server PSV to the reserved hard disk drive HDD.

Next, in Step S216, the job allocation unit ALCT instructs the physical node deployment unit PND to deploy the reserved physical servers PSV, and after deployment of the physical servers PSV, instructs the physical node deployment unit PND to execute the job. According to the instruction from the job allocation unit ALCT, the physical node deployment unit PND deploys the physical servers PSV, and inputs the job into the deployed physical servers PSV. Then, when the physical servers PSV complete execution of the job, the physical node deployment unit PND notifies the completion to the job allocation unit ALCT.

Next, in Step S218, based on a job completion notification sent from the physical node deployment unit PND, the job allocation unit ALCT updates the physical resource database PRDB and the disk resource database HDB. By updating the physical resource database PRDB and the disk resource database HDB, the physical servers PSV and the hard disk drives HDD used to execute the job are released. When a job succeeding the completed job is present in the front queue FCUE, the job allocation unit ALCT stores the ID of the executed job in the area of "ID of previously executed job" in the disk resource database HDB. Then, the operation of the job allocation unit ALCT is finished.

Figure 16:
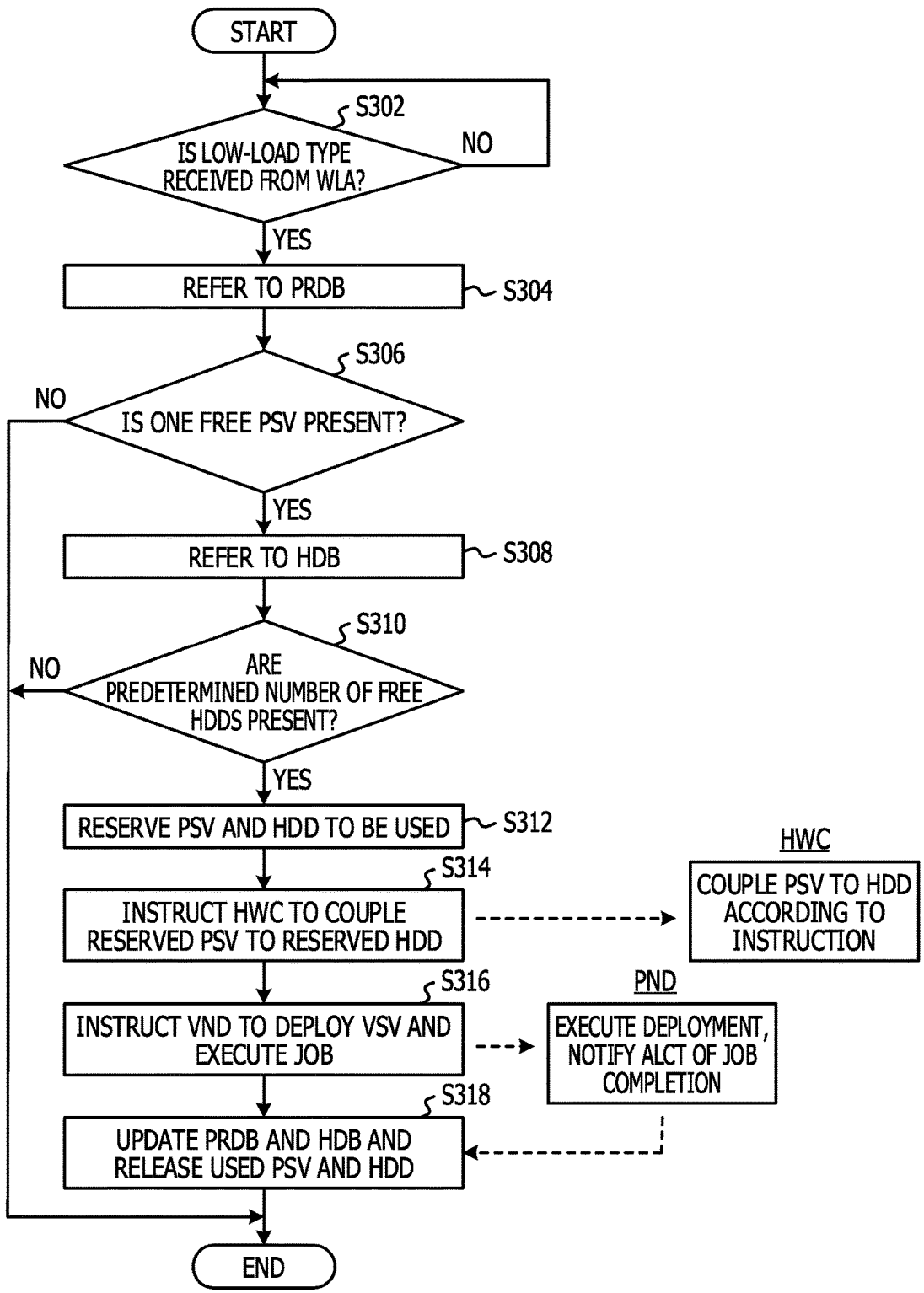
FIG. 16 illustrates another example of the operation of the job allocation unit illustrated in FIG. 2.

FIG. 16 illustrates another example of the operation of the job allocation unit ALCT illustrated in FIG. 2. Detailed description of the same operation as the operation in FIG. 15 is omitted.

First, in Step S302, the job allocation unit ALCT determines whether or not the job allocation unit ALCT receives information indicating that the type of the job is the low-load type from the workload analysis unit WLA. When the information indicating that the type of the job is received, the operation proceeds to Step S304, and when no information indicating that the type of the job is received, Step S302 is repeated.

In Step S304, referring to the physical resource database PRDB, the job allocation unit ALCT detects free physical servers PSV. Next, in Step S306, the job allocation unit ALCT shifts the operation to Step S308 when one physical server PSV is free, and finishes the operation when no free physical servers PSV is present.

In Step S308, referring to the disk resource database HDB, the job allocation unit ALCT detects free hard disk drives HDD. Next, in Step S310, the job allocation unit ALCT shifts the operation to Step S312 when a predetermined number of hard disk drives HDD are free, and finishes the operation when the predetermined number of hard disk drives HDD are not free. Here, the predetermined number denotes the number of hard disk drives HDD used for executing the job of low-load type.

In Step S312, the job allocation unit ALCT sequentially refers to the physical resource database PRDB, for example, from the top of entries, and reserves one physical server PSV to be used to execute the job. Further, the job allocation unit ALCT sequentially refers to the disk resource database HDB, for example, from the top of entries, and reserves a predetermined number of hard disk drives HDD to be used to execute the job. When the job ID is stored in the area of "ID of previously executed job" in the disk resource database HDB, the job allocation unit ALCT selects the hard disk drive HDD corresponding to the area that stores the job ID. As illustrated in FIG. 8, the job allocation unit ALCT updates the physical resource database PRDB and the disk resource database HDB based on securing of the physical servers PSV and the hard disk drives HDD.

Next, in Step S314, the job allocation unit ALCT instructs the configuration change unit HWC to couple the reserved physical server PSV to the reserved hard disk drive HDD. According to an instruction from the job allocation unit ALCT, the configuration change unit HWC controls the switch control unit SWC to couple the reserved physical server PSV to the reserved hard disk drive HDD.

Next, in Step S316, the job allocation unit ALCT instructs the virtual node deployment unit VND to deploy the virtual servers VSV in the reserved physical server PSV, and after deployment of the virtual servers VSV, instructs the virtual node deployment unit VND to execute the job. According to instructions from the job allocation unit ALCT, the virtual node deployment unit VND deploys the virtual servers VSV, and inputs the job to the deployed virtual servers VSV. Then, when the virtual servers VSV complete execution of the job, the virtual node deployment unit VND notifies the completion of the job to the job allocation unit ALCT.

Next, in Step S318, based on the job completion notification sent from the virtual node deployment unit VND, the job allocation unit ALCT updates the physical resource database PRDB and the disk resource database HDB. By updating the physical resource database PRDB and the disk resource database HDB, the physical servers PSV in which the virtual servers VSV that executes the job are deployed, and the hard disk drive HDD are released. When a job succeeding the executed job is present in the front queue FCUE, the job allocation unit ALCT stores the ID of the executed job in the area of "ID of previously executed job" in the disk resource database HDB. Then, the operation of the job allocation unit ALCT is finished.

Figure 17:
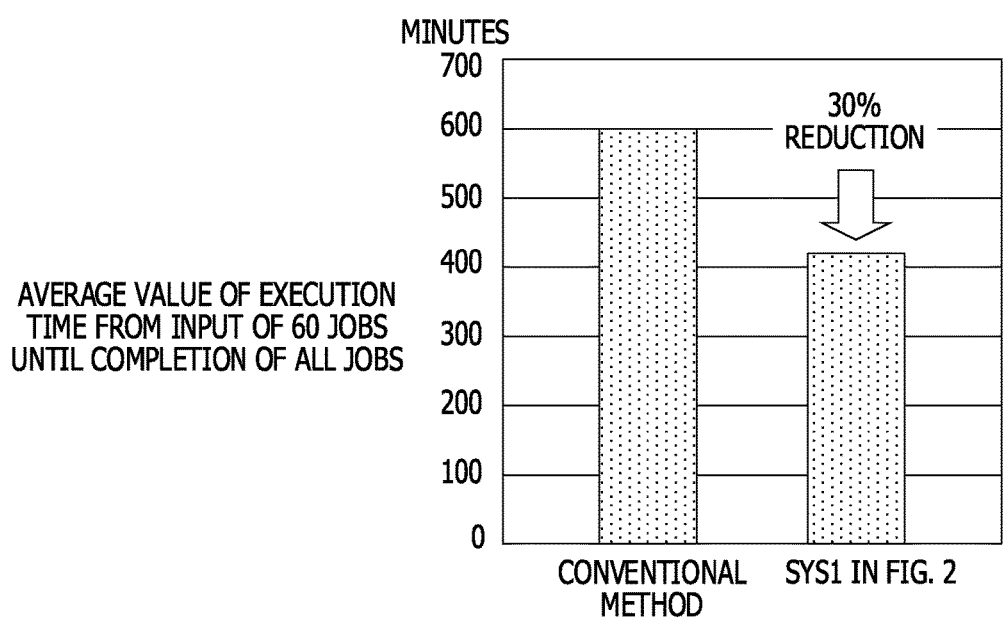
FIG. 17 illustrates an example of a processing time of jobs in the information processing system illustrated in FIG. 2.

FIG. 17 illustrates an example of a processing time of jobs in the information processing system SYS1 illustrated in FIG. 2. The example in FIG. 17 illustrates an evaluation result with a simulator that installs an algorithm of the management server MSV for controlling the operation of the resource pool RSCPL. In the evaluation, 60 jobs are executed by using 12 physical servers PSV. The ratio between the jobs of high-load type and the jobs of low-load type is 1:1, and each job is executed by using five nodes (five physical servers PSV or five virtual servers VSV). When the CPU usage ratio exceeds 10% (threshold), the job type is determined as the high-load type.

In simulation, the management server MSV executes the job of high-load type in preference to the job of low-load type, and when a free node is present, executes the job of low-load type. When one free physical server PSV is present, the job of low-load type can be executed. When five or more physical servers PSV are not present, the job of high-load type is not executed.

In simulation, an execution time taken from input of a first job to the front queue FCUE until completion of all jobs is shorter by 30% than in the conventional case (the time reduces from 600 minutes to 420 minutes). The execution time mentioned above includes a queuing time of the jobs in the job queue JCUE, and is equal to an average value of response time from transmission of 60 jobs to the information processing system SYS1 by the user until reception of execution results of all the jobs.

Also in the embodiment illustrated in FIG. 2 to FIG. 17, as in the embodiment illustrated in FIG. 1, the number of free physical servers PSV during execution of the job of low-load type can be increased as compared to the conventional case, which provides more chances to input a job than in the conventional case. Further, the hard disk drive HDD that holds the execution result of the job of low-load type is newly coupled to the physical server PSV that is to execute the job of high-load type, and the physical server PSV is enabled to execute the succeeding job without transferring the data. Because no data is copied or transferred between the hard disk drives HDD, the execution efficiency of the job JB is improved in comparison with the conventional case. As a result, a time from input of jobs to the management server MSV until completion of the jobs is shorter than in the conventional case.

Further, in the embodiment illustrated in FIG. 2 to FIG. 17, the virtual servers VSV activated in the physical servers PSV execute the job of low-load type, improving the usage efficiency of the resource pool RSCPL as well as the job processing efficiency. In other words, by determining whether the job is executed by the physical server PSV or the virtual server VSV based on the CPU usage ratio acquired through the type determination test, the job processing efficiency and the performance of the information processing system SYS1 are enhanced.

Further, since the test queue TCUE and the job queue JCUE hold a common job before the type determination test, the job used to perform the type determination test may not be lost, and the job can become executable after the type determination test.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a plurality of physical calculation nodes each including a first processor; and
a controller including a memory and a second processor coupled to the memory,
wherein the second processor is configured to execute a process including:
upon receipt of a target job, executing a type determination test on the target job by executing a part of the target job on a given number of first physical calculation nodes selected from among unused physical calculation nodes of the plurality of physical calculation nodes, and monitoring a processing load for execution of the target job,
determining a type of the target job, based on the processing load obtained by the type determination test,
transmitting a first instruction to the given number of first physical calculation nodes selected from among the unused physical calculation nodes to execute the target job by using the given number of first physical calculation nodes, when the determining determines the type of the target job is a first type, and
transmitting a second instruction to a second physical calculation node selected from among the unused physical calculation nodes to execute the target job by using the second physical calculation node, when the determining determines the type of the target job is a second type which requires a lower processing load for the execution than the first type,
wherein the second instruction activates the given number of virtual machines to run on the second physical calculation node to execute the target job by using the given number of virtual machines in parallel within the second physical calculation node to decrease a number of physical calculation nodes that are newly selected from among the unused physical calculation nodes for execution of the target job.

2. The system according to claim 1, wherein
the process further includes:
transmitting a third instruction to at least one physical calculation node among the plurality of physical calculation nodes to execute the target job, and
monitoring a processing load of the at least one physical calculation node during execution of the target job,
the determining determines the type of the target job based on the monitoring.

3. The system according to claim 2, wherein
the monitoring includes obtaining load information indicating the processing load of the at least one physical calculation node during execution of the target job, and
the determining determines the type of the target job by comparing the load information with a threshold.

4. The system according to claim 3, wherein
the load information is a usage ratio of a processor included in the at least one physical calculation node during execution of the target job.

5. The system according to claim 2, wherein
the at least one physical calculation node instructed to execute the target job by the third instruction is different from the first physical calculation node.

6. The system according to claim 2, further comprising:
a first queue and a second queue, the target job being stored in the first queue and the second queue being read and deleted after execution of the target job,
wherein
the third instruction instructs execution of the target job stored in the first queue, and
each of the first instruction and the second instruction instruct execution of the target job stored in the second queue.

7. The system according to claim 1, further comprising:
one or more input-output devices,
wherein the process further includes:
controlling coupling one of the first physical calculation node instructed to execute the target job by the first instruction and the second physical calculation node on which the plurality of virtual machines instructed to execute the target job by the second instruction run with at least one input-output device among the one or more input-output devices.

8. The system according to claim 7, further comprising:
a switch configured to switch couplings between the plurality of physical calculation nodes and the one or more input-output devices,
wherein the controlling of the coupling includes controlling the switch.

9. The system according to claim 7, wherein
when the target job is executed by the plurality of virtual machines, data acquired by executing the target job is stored in at least one input-output device coupled to the second physical calculation node,
the process further includes:
when another target job succeeding the target job is to be executed by the first physical calculation node, controlling the coupling such that the at least one input-output device is coupled to the first physical calculation node.

10. The system according to claim 9, wherein
the process further includes:
  instructing at least one physical calculation node among the plurality of physical calculation nodes to execute the other target job,
  controlling the coupling such that the at least one physical calculation node is coupled to another input-output device other than the at least one input-output device among the one or more input-output device, and
  monitoring a processing load of the at least one physical calculation node during execution of the other target job,
  the determining determines the type of the target job based on the monitoring.

11. The system according to claim 1, wherein the process further includes:
  when the first physical calculation node is inactive, controlling activation of the first physical calculation node prior to the first instruction.

12. The system according to claim 1, wherein the process further includes:
  when one or more virtual machine among the plurality of the virtual machines is inactive, controlling activation of the one or more virtual machine prior to the second instruction.

13. A method of controlling to execute a job on a system including a plurality of physical calculation nodes, the method comprising:
  upon receipt of a target job, executing a type determination test on the target job by executing a part of the target job on a given number of first physical calculation nodes selected from among unused physical calculation nodes of the plurality of physical calculation nodes, and monitoring a processing load for execution of the target job;
  determining a type of the target job, based on the processing load obtained by the type determination test;
  transmitting a first instruction to the given number of first physical calculation nodes selected from among the unused physical calculation nodes to execute the target job by using the given number of first physical calculation nodes, when the determining determines that the type of the target job is a first type; and
  transmitting a second instruction to a second physical calculation node selected from among the unused physical calculation nodes to execute the target job by using the second physical calculation node, when the determining determines the type of the target job is a second type which requires a lower processing load for the execution than the first type,
  wherein the second instruction activates the given number virtual machines to run on the second physical calculation node to execute the target job by using the given number of virtual machines in parallel within the second physical calculation node to decrease a number of physical calculation nodes that are newly selected from among the unused physical calculation nodes for execution of the target job.

14. The method according to claim 13, further comprising:
  transmitting a third instruction to at least one physical calculation node among the plurality of physical calculation nodes to execute the target job; and
  monitoring a processing load of the at least one physical calculation node during execution of the target job,
  wherein the determining determines the type of the target job based on the monitoring.

15. The method according to claim 14, wherein
the at least one physical calculation node instructed to execute the target job by the third instruction is different from the first physical calculation node.

16. The method according to claim 14, wherein the system includes a first queue and a second queue, a job stored in the first queue and the second queue being read and deleted after execution of the job,
  wherein
    the third instruction instructs execution of the target job stored in the first queue, and
    each of the first instruction and the second instruction instructs execution of the target job stored in the second queue.

17. The method according to claim 13, wherein the system includes one or more input-output devices,
  wherein the method further comprising:
    controlling coupling one of the first physical calculation node instructed to execute the target job by the first instruction and the second physical calculation node on which the plurality of virtual machines instructed to execute the target job by the second instruction run with at least one input-output device among the one or more input-output devices.

18. The method according to claim 13, further comprising:
  when the first physical calculation node is inactive, controlling activation of the first physical calculation node prior to the first instruction.

19. The method according to claim 13, further comprising:
  when one or more virtual machine among the plurality of the virtual machines is inactive, controlling activation of the one or more virtual machine prior to the second instruction.

20. An apparatus configured to control to execute a job on a system including a plurality of physical calculation nodes each including a first processor, the apparatus comprising:
  a memory; and
  a second processor coupled to the memory and configured to:
    upon receipt of a target job, execute a type determination test on the target job by executing a part of the target job on a given number of first physical calculation nodes selected from among unused physical calculation nodes of the plurality of physical calculation nodes, and monitoring a processing load for execution of the target job,
    determine a type of the target job, based on the processing load obtained by the type determination test,
    instruct the given number of first physical calculation nodes selected from among the unused physical calculation nodes to execute the target job by using the given number of first physical calculation nodes when the determining determines the type of the target job is a first type, and
    instruct a second physical calculation node from among the unused physical calculation nodes to execute the target job by using the second physical calculation node, when the determining determines the type of the target job is a second type which requires a lower processing load for the execution than the first type,
    wherein, when instructing the second physical calculation node to execute the target job, the second processor activates the given number of virtual machines to run on the second physical calculation node to execute the target job by using the given number of virtual machines in parallel within the second physical calculation node to decrease a number of physical calculation nodes that are newly selected from among the unused physical calculation nodes for execution of the target job.

\* \* \* \* \*